US012794835B2

(12) United States Patent
Tv

(10) Patent No.: US 12,794,835 B2
(45) Date of Patent: Nov. 10, 2026

(54) REAL-TIME USER RESPONSE MODIFICATIONS FOR CUSTOMER INTERACTIONS

(71) Applicant: Salesforce, Inc., San Francisco, CA (US)

(72) Inventor: Lakshmi Tv, Bangalore (IN)

(73) Assignee: Salesforce, Inc., San Francisco, CA (US)

( * ) Notice: Subject to any disclaimer, the term of this patent is extended or adjusted under 35 U.S.C. 154(b) by 217 days.

(21) Appl. No.: 18/618,737

(22) Filed: Mar. 27, 2024

(65) Prior Publication Data

US 2025/0310279 A1 Oct. 2, 2025

(51) Int. Cl.

*H04L 13/08* (2006.01)
*G10L 15/26* (2006.01)
*H04L 51/02* (2022.01)
*H04M 3/51* (2006.01)
*G10L 13/08* (2013.01)

(52) U.S. Cl.

CPC .......... *H04L 51/02* (2013.01); *H04M 3/5166* (2013.01); *G10L 13/08* (2013.01); *G10L 15/26* (2013.01)

(58) Field of Classification Search

CPC ...... H04L 51/02; H04M 3/5166; G10L 13/08; G10L 15/26
USPC ...................................................... 379/88.01
See application file for complete search history.

(56) References Cited

U.S. PATENT DOCUMENTS

| | | | | |
|---|---|---|---|---|
| 9,634,855 | B2 * | 4/2017 | Poltorak | G10L 15/22 |
| 11,050,885 | B1 * | 6/2021 | Yannam | H04M 3/5183 |
| 2020/0279553 | A1 * | 9/2020 | McDuff | G10L 25/78 |
| 2024/0104336 | A1 * | 3/2024 | Irving | G06N 3/006 |
| 2024/0111960 | A1 * | 4/2024 | Earle | G06F 40/35 |
| 2024/0203404 | A1 * | 6/2024 | Shabat | G10L 15/16 |
| 2025/0022573 | A1 * | 1/2025 | Darcy | G06F 40/30 |
| 2025/0278630 | A1 * | 9/2025 | Horesh | G06N 3/0895 |
| 2025/0292262 | A1 * | 9/2025 | Noor | G06Q 30/016 |
| 2025/0298970 | A1 * | 9/2025 | Khosla | G06F 40/20 |
| 2025/0298988 | A1 * | 9/2025 | Buchanan | G06F 40/35 |
| 2025/0300950 | A1 * | 9/2025 | Bayardelle | H04L 51/216 |

* cited by examiner

*Primary Examiner* — Binh Kien Tieu
(74) *Attorney, Agent, or Firm* — Holland & Hart, LLP.

(57) ABSTRACT

An utterance modification system may receive a first utterance from a first user during an interactive conversation session between the first user and a second user. The utterance modification system may further receive a second utterance from the second user that is in a speech-based format. The utterance modification system may then transmit a prompt that includes the second utterance in a text-based format and a set of prompt parameters to a large language model (LLM). In response, the utterance modification system may receive a third utterance from the LLM that may be based on the second utterance and associated with a target user tone. Further, the utterance modification system may transmit the third utterance to the first user in a speech-based format.

20 Claims, 10 Drawing Sheets

REAL-TIME USER RESPONSE MODIFICATIONS FOR CUSTOMER INTERACTIONS

FIELD OF TECHNOLOGY

The present disclosure relates generally to database systems and data processing, and more specifically to real-time user response modifications for customer interactions.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

DETAILED DESCRIPTION

Figure 1:
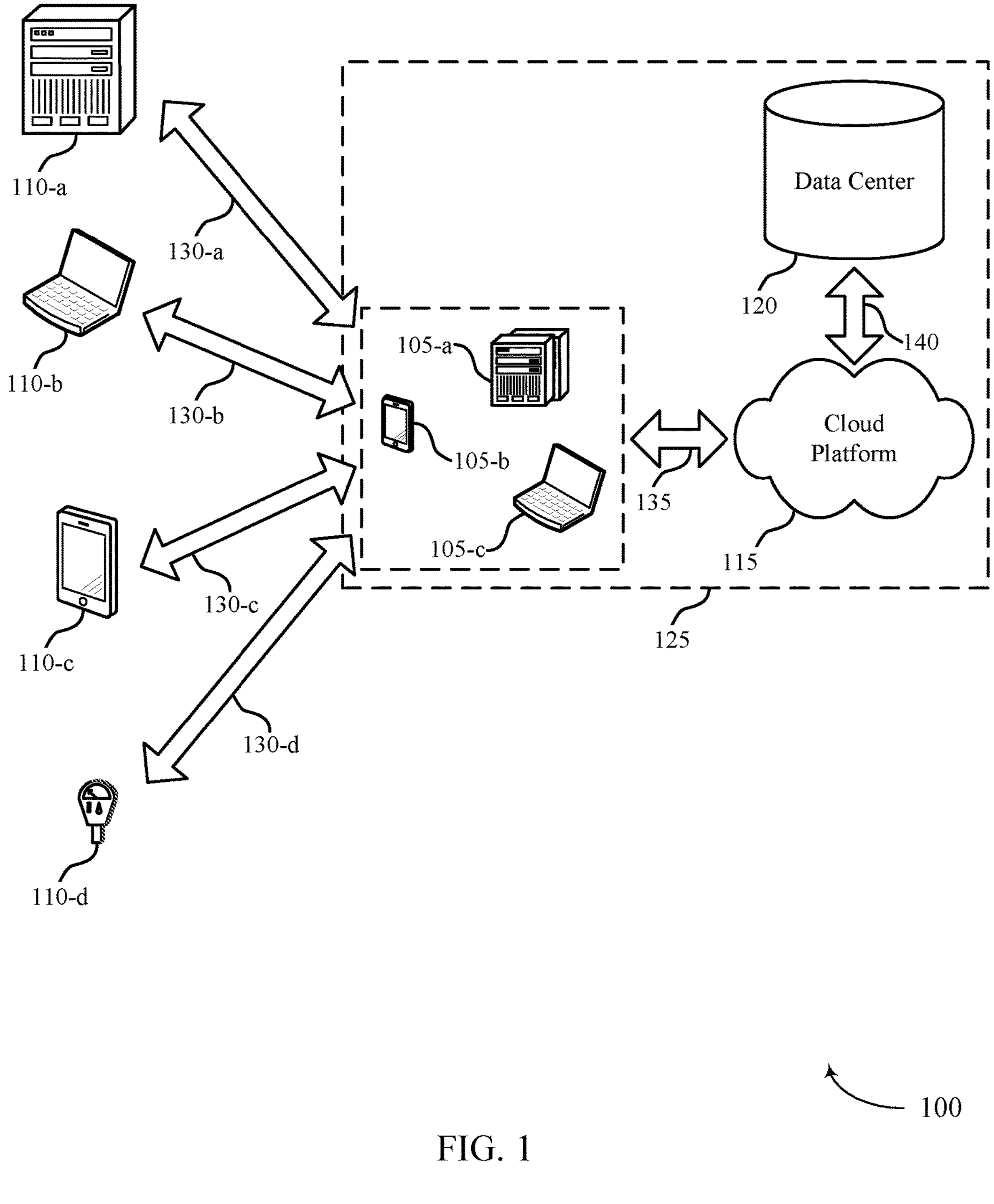
FIG. 1 illustrates an example of a data processing system that supports real-time user response modifications for customer interactions in accordance with aspects of the present disclosure.

When customer service representatives converse with customers the customer service representatives may be instructed to maintain polite and kind tones with customers on calls or chats. When conversing with customer service representatives, customers may often speak in frustrated or rude tones to customer service representatives. Further, it may be common for customer service representatives to also become frustrated, which can result in a customer service representative conversing with a customer in a rude manner. However, as customer service representatives are instructed to maintain a polite tone and be mindful about their choice of words when conversing with frustrated, rude, or angry customers, the customer service representatives may have to hold back their frustration to an acceptable customer satisfaction (CSAT) score. CSAT scores may be an example of a metric used to determine the performance of a customer service representative. Therefore, holding back frustrations to maintain a high CSAT score, customer service representatives may experience an increase in stress which can result in an increase in fatigue and burnout of customer service representatives.

In some examples, in an effort to maintain a polite tone, a customer service representative may input a response into a generative artificial intelligence (AI) model to receive a polite response. For example, a customer service representative that is on a call with a customer may be frustrated with the customer and rather than giving the customer a frustrated or impolite response, the customer service representative may use a generative AI model (e.g., a large language model (LLM)) to generate a polite response. However, to generate the polite response, the customer service representative may have to type or dictate an initial response to a LLM and prompt the LLM with a set of instructions and parameters on how to generate a polite response based on the initial response from the customer service representative. Further, after receiving the polite response from the LLM, the customer service representative may have to read off the generated response to the user while still maintaining a polite tone of voice. However, such techniques may result in high levels of signaling overhead between a customer service representative and an LLM and can be relatively time consuming. Thus, due to a lack of connection between the customer service representative, the LLM, and the customer conversing with the customer service representative, there may be an increase in response delays from the customer service representative to the customer resulting in an inefficient and unreliable customer service platform.

The techniques of the present disclosure may address the lack of connection by introducing an utterance modification system that interfaces multiple different models to autonomously modify customer service representative utterances or responses. For example, a customer (e.g., a first user) and a customer service representative (e.g., a second user) may communicate during an interactive conversation session (e.g., a chat session or a voice call) of a communication platform connected to the utterance modification system. During the interactive conversation session, the utterance modification system may receive a first utterance from the first user and a second utterance from the second user in response to the first utterance. In some examples, an utterance may be an example of a portion of a conversation between users. Further, the interactive conversation session may be an example of a telephone call such that the first utterance and second utterance are in a first natural language format (e.g., a speech-based format). In such example, an utterance in a speech-based natural language format may include a set of phonemes or sounds that make up a set of words and sentences uttered by a respective user. The utterance modification system may then convert the second utterance from the first natural language format to a second natural language format (e.g., a text-based format) via a speech-to-text model of the utterance modification system. Based on the second utterance being in a text format, the utterance modification system may transmit a prompt to an LLM that includes a text-based version of the second utterance and one or more prompt parameters associated with the second user. In response to the prompt, the utterance modification system may receive a third utterance from the LLM that is in the second natural language format. The third utterance may include content or information that is based on the content or information from the second utterance (e.g., the customer service representative response to a customer utterance). Further, the content of the third utterance may be associated with a target user tone (e.g., a polite and kind tone) that is based on the one or more prompt parameters. Once the utterance modification system receives the third utterance, the utterance modification system may convert the third utterance from the second natural language format to the first natural language format. The utterance modification system may then transmit the third utterance to the first user in response to the first utterance from the first user.

In some examples, the utterance modification system may establish or be configured with one or more interfaces between various platforms and services. For example, the utterance modification system may establish a first interface between a communication platform that hosts the interactive conversation and a second interface between the utterance modification system and the LLM used to generate the third utterance. Therefore, the utterance modification system may be capable of modifying utterances automatically without user input by a customer service representative. Such techniques may result in a decrease in signaling overhead and a decrease in delay, thus enabling the utterance modification system the capability of providing real-time responses to users (e.g., customers). In some other examples, the text-to-speech model of the utterance modification system may include a voice model of a respective user (e.g., a customer service representative). For example, to enable the utterance modification system the capability to transmit utterances to customers as if the utterances are from respective customer service representatives, the utterance modification system may employ voice models that are associated with respective customer service representatives. In some cases, the voice models may be referred to as deepfake voice models that mimic the voice, tone, and inflection of a user. Further, the voice models may be trained on a phonetic alphabet of a language such that the voice model is capable of generating a set of phonemes to represent an utterance generated by an LLM. Additionally, or alternatively, the utterance modification system may include a user interface (UI) that users can use to adapt the prompt parameters for the LLM generated response, train or retrain a voice model associated with the user, or a combination thereof. The UI may enable users to dynamically adapt how the LLM generates utterances and how the generated utterances are converted from a text-based format to a speech-based format.

Aspects of the disclosure are initially described in the context of an environment supporting an on-demand database service. Additional aspects of the disclosure are described with reference to computing systems and process flows. Aspects of the disclosure are further illustrated by and described with reference to apparatus diagrams, system diagrams, and flowcharts that relate to real-time user response modifications for customer interactions.

FIG. 1 illustrates an example of a system 100 for cloud computing that supports real-time user response modifications for customer interactions in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some examples, the system 100 may include or may implement a communication platform for interactive conversation sessions between one or more users. Further, the interactive conversation session may be between users of cloud clients 105 or contacts 110. In some cases, users of the system 100 within an interactive conversation session of a communication platform may modify response utterances to maintain a target user tone in responses. For example, in customer service operations, customer service representatives may be instructed to maintain a target user tone (e.g., a polite and kind tone) when conversing with customers during an interactive conversation session regardless of whether the customer service representative is frustrated with the customer. Therefore, users (e.g., customer service representatives) may use LLMs to modify responses to maintain the target user tone. In some examples, in order to modify utterances, users may have to manually input utterances into an LLM and manually transform the text-based response of the LLM into a speech-based response. However, such manual processes may result in a relatively high level of signaling overhead between a user and an LLM which can be relatively time consuming. Therefore, users may experience an increase in delay during an interactive conversation session which can decrease the effectiveness of using the LLM to generate responses.

Therefore, in accordance with the techniques of the present disclosure, a user may use an utterance modification system to automatically convert the natural language format of utterances and automatically generate additional utterances via an LLM during an interactive conversation session. In some examples, the utterance modification system may be a part of or implemented by the system 100. In some cases, the utterance modification system may be hosted on the cloud platform 115 via a cloud client 105. In some other cases, the utterance modification system may be locally hosted via a contact 110. Further, the utterance modification system may include a speech-to-text model and a text-to-speech model for converting the natural language formats of utterances. In some examples, the speech-to-text model and the text-to-speech model of the utterance modification system may be hosted on the same device or platform as the utterance modification system or different devices or platforms. For example, if the utterance modification is local to a contact 110 the speech-to-text model and the text-to-speech model may be hosted on the cloud platform 115.

Further, one or more users of the system 100 may use the utterance modification system. For example, an interactive conversation session between a first user of the system 100 and a second user of the system 100 may use the utterance modification system. In some examples, the interactive conversation session may be a customer service call between a customer (e.g., the first user) and a customer service representative (e.g., the second user). In such examples, the customer may express an issue (e.g., the first utterance) to the customer service representative and due to the customer service representative being frustrated, the customer service representative may respond to the issue (e.g., via a second utterance) in a frustrated tone. To avoid the customer hearing the frustrated response of the customer service representative, the customer service representative may use the utterance modification system to modify the frustrated response into a polite response. Therefore, based on the utterance modification system establishing an interface with the communication platform that hosts the interactive conversation session, the utterance modification system may receive the frustrated response from the customer service representative before the response is sent to the customer.

To modify the frustrated response the utterance modification system may convert the natural language format of the frustrated response from a first natural language format (e.g., a speech-based format) to a second natural language format (e.g., a text-based format). The response may be converted from the first natural language format to the second natural language format to enable an LLM the capability of receiving the response as an input. Therefore, the utterance modification system may send an LLM a prompt that includes the text-based response from the customer service representative. The prompt may also include one or more prompt parameters which the customer service representative may configure via a UI of the utterance modification system. Further, the utterance modification system may automatically transmit the text-based response to the LLM after conversion of the natural language format of the response based on the utterance modification system establishing an interface with the LLM. Based on receiving the prompt including the frustrated response, the LLM may generate a polite response that is based on the frustrated response. The utterance modification system may then convert the polite response from a text-based format to a speech-based format via the text-to-speech model of the utterance modification system such that the customer receives the polite response in the same voice as the customer service representative. Further descriptions of the techniques of the present disclosure that enables the utterance modification system the capability of modifying user responses in real-time may be described elsewhere herein, such as with reference to FIGS. 2 through 4.

In some examples, the techniques of the present disclosure may enable a device (e.g., a contact 110 or a cloud client 105) to autonomously convert the format of an utterance. For example, based on one or more integrations being present between a communication platform, an utterance modification system, and an LLM, the techniques of the present disclosure may enable the conversion of an utterance from a first natural language format that is common to the communication platform to a second natural language format such that the utterance can be ingested by an LLM. In some examples, as described elsewhere herein, the communication platform may include an interactive conversation session between a first user and a second user communicating using a speech-based natural language format. Since LLMs use text-based natural language formats as an input, the utterance modification system may receive a speech-based conversation utterance from a user automatically via an integration between the utterance modification system and the communication platform such that the utterance can be converted from a speech-based natural language format to a text-based natural language format. Following, the LLM may change the content of the utterance and transmit the utterance with the changed content back to the utterance modification system automatically to be converted from the text-based natural language format used by the LLM to the speech-based natural language format used by the interactive conversation session. Therefore, the techniques of the present disclosure may enable the conversion of the natural language format of utterances to match the correct input natural language format of a respective platform or model.

In some other examples, the utterance modification system may be modified and tuned via one or more parameters to determine a quantity of content used by an LLM to generate a response. For example, the utterance modification system may have a response time parameter to indicate how fast a response should be generated and produced by the LLM and a voice model of the utterance modification system to be transmitted within an interactive conversation session. In some cases, if the response time is set to be relatively high, the LLM may use relatively smaller portions of data (e.g., smaller utterance segments), which may result in a reduction in computing resource overhead (e.g., reduction in the amount of data ingested and processed by one or more models). For example, when users are communicating within a communication platform, the utterance modification system may extract portions of utterances from a respective user autonomously such that the LLM may generate a more polite version of the utterance. When the response time is set to be relatively high, such utterance portions or segments may be relatively small such as a few words or a few seconds of the utterance, therefore, the LLM may be capable of generating an utterance near-real time. However, in some examples, using relatively small portions or segments of data may impact the quality of the utterances generated by the LLM. Therefore, in some examples, to enhance the quality, the response time parameter may be set relatively lower to enable the LLM to receive relatively larger portions or segments of an utterance. In some cases, users may be capable of making such adjustments to parameters of the utterance modification system via a UI such that the utterance modification system may be updated over time (e.g., dynamically) to enable the techniques of the present disclosure the ability to provide a customized, efficient, and reliable experience to users.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
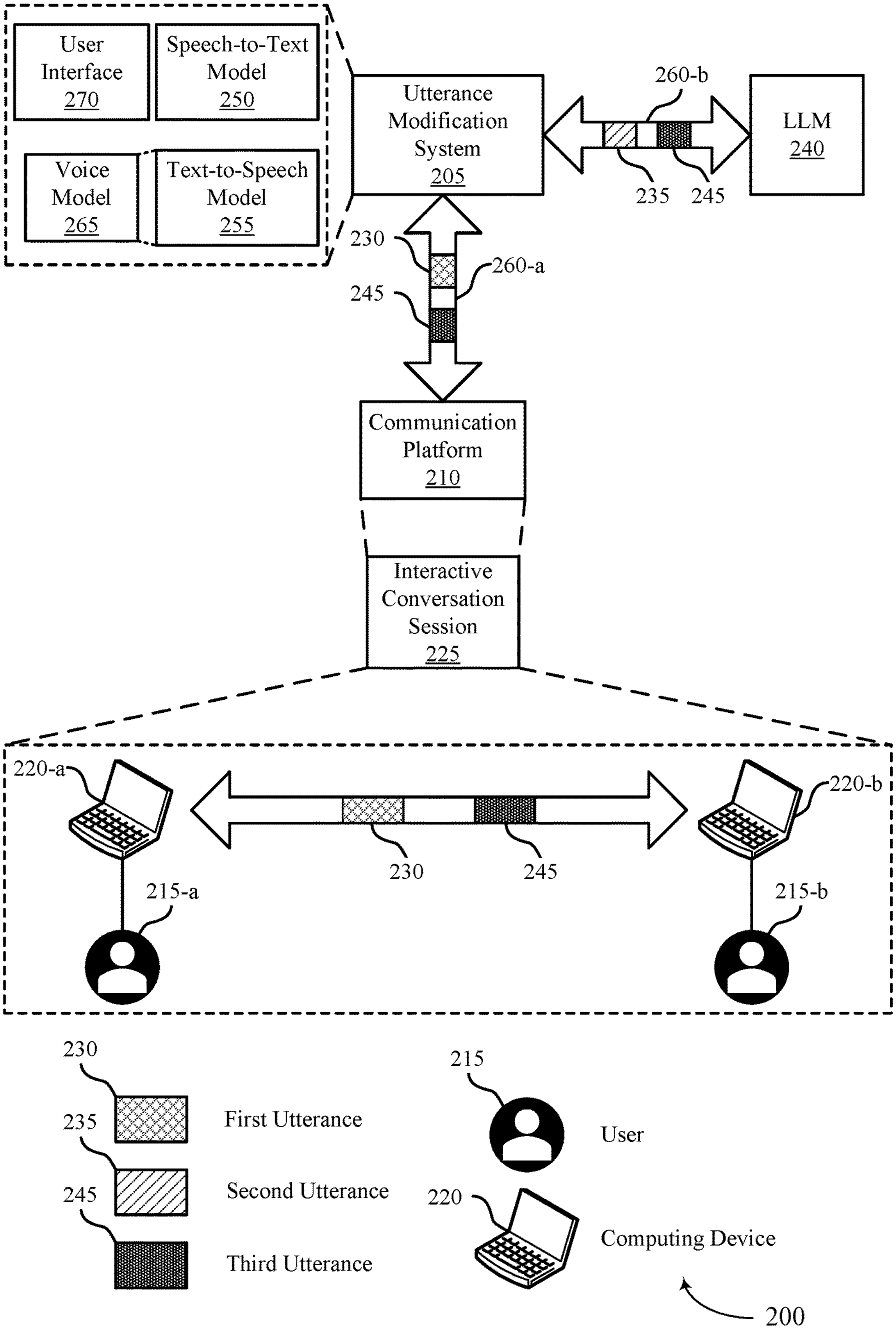
FIG. 2 shows an example of a computing system that supports real-time user response modifications for customer interactions in accordance with aspects of the present disclosure.

FIG. 2 shows an example of a computing system 200 that supports real-time user response modifications for customer interactions in accordance with aspects of the present disclosure. In some examples, the computing system 200 implements or may be implemented by the system 100. For example, the computing system 200 may include an utterance modification system 205 and a communication platform 210 that may be implemented by devices or services described with reference to FIG. 1. Further, the computing system 200 may include one or more users 215 (e.g., a user 215-*a* and a user 215-*b*) operating computing devices (e.g., a computing device 220-*a* and a computing device 220-*b*) where the computing devices 220 may be examples of cloud clients 105 or contacts 110 described with reference to FIG.

1. Additionally, or alternatively, the computing system 200 may be a multi-tenant system or a part of a multi-tenant system such that the users 215 are tenants of the multi-tenant system.

In some examples, the user 215-*a* may communicate with the user 215-*b* via an interactive conversation session 225 hosted on the communication platform 210. The interactive conversation session 225 may be an example of a telephone call, a video conference call, a text chat, or any combination thereof. Further, the communication platform may be an example of a video conferencing platform or service, a chat platform, a group-based communication platform, or any combination thereof. In some examples, the user 215-*a* may be an example of a customer, the user 215-*b* may be an example of a customer service representative, and the interactive conversation session 225 may be an example of a call between the user 215-*a* and the user 215-*b*.

In general, the user 215-*b* may perform a relatively large quantity of calls within a relatively short period (e.g., an hour, a day) and the user 215-*b* may be instructed to maintain a patient and polite tone with customer queries. However, it may be natural for the user 215-*b* to become exhausted, agitated, annoyed, or frustrated at times but to maintain a high CSAT score, the user 215-*b* may have to maintain a level of professionalism to ensure such emotions are not expressed with customers (e.g., the user 215-*a*) during a call (e.g., an interactive conversation session 225). CSAT scores may be examples of performance indicators used to track how satisfied a customer is with the products or services of a company or organization. The scores may be generated by asking customers one or more questions to rate their level of satisfaction on a scale (e.g., a scale of 1-5 or 1-10). For example, after the interactive conversation session 225 between the user 215-*a* and the user 215-*b* concludes, the user 215-*a* may be asked to rate the interactive conversation session 225 with the user 215-*b*. Thus, based on one or more interactive conversation sessions 225 with customers, the user 215-*b* may receive a CSAT score which may be equal to a quantity of satisfied customers (e.g., customers that responded with a rating satisfying or being above a rating threshold) divided by the quantity of survey responses multiplied by 100. Therefore, the CSAT score of the user 215-*b* may be a percentage score with higher percentages indicating a relatively higher level of customer satisfaction. Further, companies may use CSAT scores to measure customer sentiment and overall customer experience satisfaction. Thus, customer service representatives (e.g., the user 215-*b*) may be expected to maintain relatively high CSAT scores to ensure a relatively high level of customer satisfaction.

In some examples, customers (e.g., the user 215-*a*) may be frustrated with the services of a company or organization and such frustrations may be vocalized to customer service representatives (e.g., the user 215-*b*) during a call (e.g., the interactive conversation session 225). To maintain a relatively high CSAT score, the user 215-*b* may attempt to maintain a kind, polite, and professional tone when conversing with the user 215-*a*. However, the user 215-*b* may become frustrated during the interactive conversation session 225 which if expressed during the interactive conversation session 225 can impact the rating that the user 215-*a* gives the user 215-*b*. Further, the user 215-*b* may experience fatigue and emotional stress when maintaining a polite and professional tone while being frustrated with the user 215-*a* resulting in burnout between customer service representatives.

In some cases, to respond in a polite and professional tone, customer service representatives (e.g., the user 215-*b*) may use AI or machine learning (ML) models (e.g., AI/ML models) to modify a response to a customer (e.g., the user 215-*a*) query to match the polite and professional tone. For example, during the interactive conversation session 225, the user 215-*b* may receive a first utterance 230 from the user 215-*a*. In response to the first utterance 230, the user 215-*b* may initially consider responding with a second utterance 235, however the tone and choice of words of the second utterance 235 may be impolite and unprofessional. Thus, the user 215-*b* may refrain from stating the second utterance 235 to the user 215-*a* during the interactive conversation session 225. Instead, the user 215-*b* may input the second utterance 235 into an AI/ML model such as an LLM 240. In some cases, LLMs (e.g., the LLM 240) may be examples of generative AI models that are trained on a relatively large corpus of text data enabling the LLMs to be able to process large amounts of text data. Further, the LLM 240 may be capable of responding to natural language queries and prompts with responses in a natural language format that users can comprehend. For example, when the LLM 240 receives the second utterance 235 as an input with a prompt instructing the LLM 240 to generate an utterance that maintains the polite and profession tone (e.g., a target user tone) the user 215-*b* is instructed to maintain, the LLM 240 may generate a third utterance 245 in the same natural language format as the second utterance 235. Further, the LLM 240 may generate the third utterance 245 with a set of content that is based on the set of content included in the second utterance 235. Therefore, the user 215-*b* may be capable of generating a more polite and professional response to the first utterance 230 from the user 215-*a* regardless of the tone of the initial response (e.g., the second utterance 235) from the user 215-*b*.

However, having the user 215-*b* manually input the second utterance 235 into the LLM 240 and manually uttering the third utterance 245 to the user 215-*a* may result in a relatively high signaling overhead. For example, to ensure that the third utterance 245 is accurate and maintains a polite and professional tone, the user 215-*b* may have to query the LLM 240 multiple times. Further, having the user 215-*b* manually input the second utterance 235 into the LLM 240 and manually uttering the third utterance 245 to the user 215-*a* may result in an increase in delay within the interactive conversation session 225. In some examples, the increase in signaling overhead and delay may also result in a decrease in the effectiveness of having the LLM 240 modify the second utterance 235 to generate the third utterance 245 to allow the user 215-*b* to maintain a polite and professional tone.

Thus, the techniques of the present disclosure support the user 215-*b* using an utterance modification system 205, to enable the user 215-*b* to use the LLM 240 in an effective manner. The utterance modification system 205 may include a speech-to-text model 250 and a text-to-speech model 255 along with one or more interfaces 260 (e.g., an interface 260-*a*, an interface 260-*b*) to enable the utterance modification system 205 to coordinate with the communication platform 210 hosting the interactive conversation session 225 and the LLM 240. For example, utterance modification system 205 may establish the interface 260-*a* between the utterance modification system 205 and the communication platform 210 such that the utterance modification system 205 may receive the first utterance 230 from the user 215-*a*, receive the second utterance 235 from the user 215-*b*, and transmit the third utterance 245 to the user 215-*a* from the user 215-*b*. Further, the utterance modification system 205 may establish the interface 260-*b* between the utterance modification system 205 and the LLM 240 to transmit the second utterance 235 to the LLM 240 and receive the third utterance 245 from the LLM 240. Such interfaces 260 may enable the utterance modification system 205 the capability of receiving and transmitting messages between the interactive conversation session 225 and the LLM 240 to allow for real-time adjustments and modifications to the utterances of the interactive conversation session 225.

For example, the utterance modification system 205 may use the speech-to-text model 250 to convert the second utterance 235 from a speech-based format to a text-based format to enable the utterance modification system 205 the capability of inputting the second utterance 235 into the LLM 240 without user input. Further, the utterance modification system 205 may use the text-to-speech model 255 to convert the third utterance 245 from a text-based format to a speech-based format via a voice model 265 that is associated with the user 215-*b*. Therefore, the utterance modification system 205 may be capable of transmitting the third utterance 245 to the user 215-*a* as if the third utterance 245 was uttered by the user 215-*b*. Thus, the utterance modification system 205 may provide a system for the user 215-*b* to modify responses and utterances without any user input during the modification process.

In some cases, the utterance modification system 205 may receive one or more user inputs from a user (e.g., the user 215-*b*) via a UI 270 that to adjust the one or more prompt parameters for prompting the LLM 240 to generate the third utterance 245. For example, the user 215-*b* may adjust a tone parameter, a response length parameter, a conversation timing parameter, or any combination thereof via the UI 270 to adjust the use of the utterance modification system 205. In some cases, the user 215-*b* may adjust the tone parameter of the one or more prompt parameters to determine the level of professionalism and formality of the third utterance 245 generated by the LLM 240. Further, the tone parameter may determine the intonation of the third utterance 245 (e.g., friendly, kind, polite) and a choice of words for the third utterance 245. For example, if the tone of the user 215-*b* is more informal, to allow the LLM 240 the ability to generate the third utterance 245 as if the third utterance 245 is from the user 215-*b*, the user 215-*b* may adjust the tone parameter accordingly. In some examples, the user 215-*b* may also be capable of selecting or inputting a set of words via the UI 270 of the utterance modification system 205 that the LLM 240 should refrain from using in the generation of the third utterance 245. Additionally, or alternatively, the user 215-*b* may select or input a set of words via the UI 270 of the utterance modification system 205 that the LLM 240 should use when generating the third utterance 245. Further, the user 215-*b* may adjust the response length parameter to determine the length of the third utterance 245. For example, the user 215-*b* may instruct the LLM 240 to generate the third utterance 245 such that the third utterance 245 is shorter than the second utterance 235, longer than the second utterance 235, or about the same length as the second utterance 235.

Additionally, or alternatively, the user 215-*b* may adjust the conversation timing parameter to determine a level of latency or delay between when the user 215-*b* utters the second utterance 235 and when the third utterance 245 is uttered to the user 215-*a* via the voice model 265 associated with the user 215-*b*. If the conversation timing parameter is adjusted downwards, the delay between the second utterance 235 and the third utterance 245 may be relatively low but there may be a decrease in the quality of the third utterance 245 and if the conversation timing parameter is adjusted upwards, the delay may be relatively high but the quality of the third utterance 245 may be relatively high. For example, if the conversation timing parameter is adjusted downwards, the utterance modification system 205 may input smaller individual samples of the second utterance 235 into the LLM 240 which may enable the utterance modification system 205 the ability to transmit a near real-time response to the first utterance 230. However, due to the smaller sample size, the LLM 240 may have less context when generating the third utterance 245. Therefore, while the delay may be higher if the conversation timing parameter is adjusted upwards, the LLM 240 may have more context when generating the third utterance 245 due to the utterance modification system 205 inputting relatively larger samples of the second utterance 235. Further, the utterance modification system 205 may receive such prompt parameter adjustments via one or more user inputs within the UI 270. In some cases, the user inputs may include a change of value within a text box, an adjustment of a slider, a selection from a drop down, or any other type of user input.

Therefore, users 215 (e.g., the user 215-*b*) may use the utterance modification system 205 to modify utterances prior to transmission during the interactive conversation session 225. In some cases, the utterance modification system 205 may be a chat plug-in for chat platforms. For example, the communication platform 210 may be a chat platform and the interactive conversation session 225 may be a text chat between the user 215-*a* and the user 215-*b*. In such cases, the utterance modification system 205 may modify a message from the user 215-*b* prior to the user 215-*b* sending the message to the user 215-*a*. For example, if the text chat is a customer service chat, the user 215-*b* may be responding to the user 215-*a* and the utterance modification system 205 may receive the response message from the user 215-*b* and input the response into the LLM 240 via a prompt that is associated with the prompt parameters configured within the UI 270. Further, based on the LLM 240 generating a modified response message, the utterance modification system 205 may display the generated message to the user 215-*b* within a UI of the communication platform 210. In some examples, the user 215-*b* may be able to accept or deny the generated message and respond to the user 215-*a* accordingly. In some other examples, the UI of the communication platform 210 may include a 'regenerate' button that the user 215-*b* can select to request the utterance modification system 205 to prompt the LLM 240 again. Further, due to the nature of LLMs, when re-prompted, the LLM 240 may generate a different but similar response based on the initial response provided by the user 215-*b*. Additionally, or alternatively, the display of the generated response may include a text box for the user 215-*b* to directly query the LLM 240. For example, the user 215-*b* may request that the generated response refrains from using a selected word or that the generated response is more informal. In some cases, the chat plug-in of the utterance modification system 205 may receive and analyze the response of the user 215-*b* and highlight words or phrases that fail to match the target tone. In such cases, the utterance modification system 205 may suggest a rephrasing of the response that matches the target tone. The user 215-*b* may then select or modify the generated response and send the response to the user 215-*a*. Over time, based on the user 215-*b* selecting and modifying the generated responses, the utterance modification system 205 may retrain and improve the quality of the generated responses for the user 215-*b*.

Additionally, or alternatively, the utterance modification system 205 may be used with social media platforms. For example, a user 215 with a social media account may request that each post maintain a target tone or persona for the user 215. Therefore, the utterance modification system 205 may suggest edits or modifications to social media posts of the user 215 to ensure that the target tone or persona is maintained. In another example, if the communication platform 210 is a group-based communication platform with one or more channels for communications between groups of users 215, users 215 may use the utterance modification system 205 to modify responses to maintain a professional tone.

Therefore, the utterance modification system 205 may be used for various situations to modify and adjust the content of responses to maintain a target user tone. Further descriptions of the utterance modification system 205 and the components of the utterance modification system 205 (e.g., the speech-to-text model 250, the text-to-speech model 255, and the voice model 265) may be described elsewhere herein, such as with reference to FIGS. 3 and 4. For example, FIG. 4 may illustrate a flow of communications between the interactive conversation session 225 of the communication platform 210 and the utterance modification system 205 and between the LLM 240 and the utterance modification system 205 via the interface 260-*a* and the interface 260-*b* respectfully.

Figure 3:
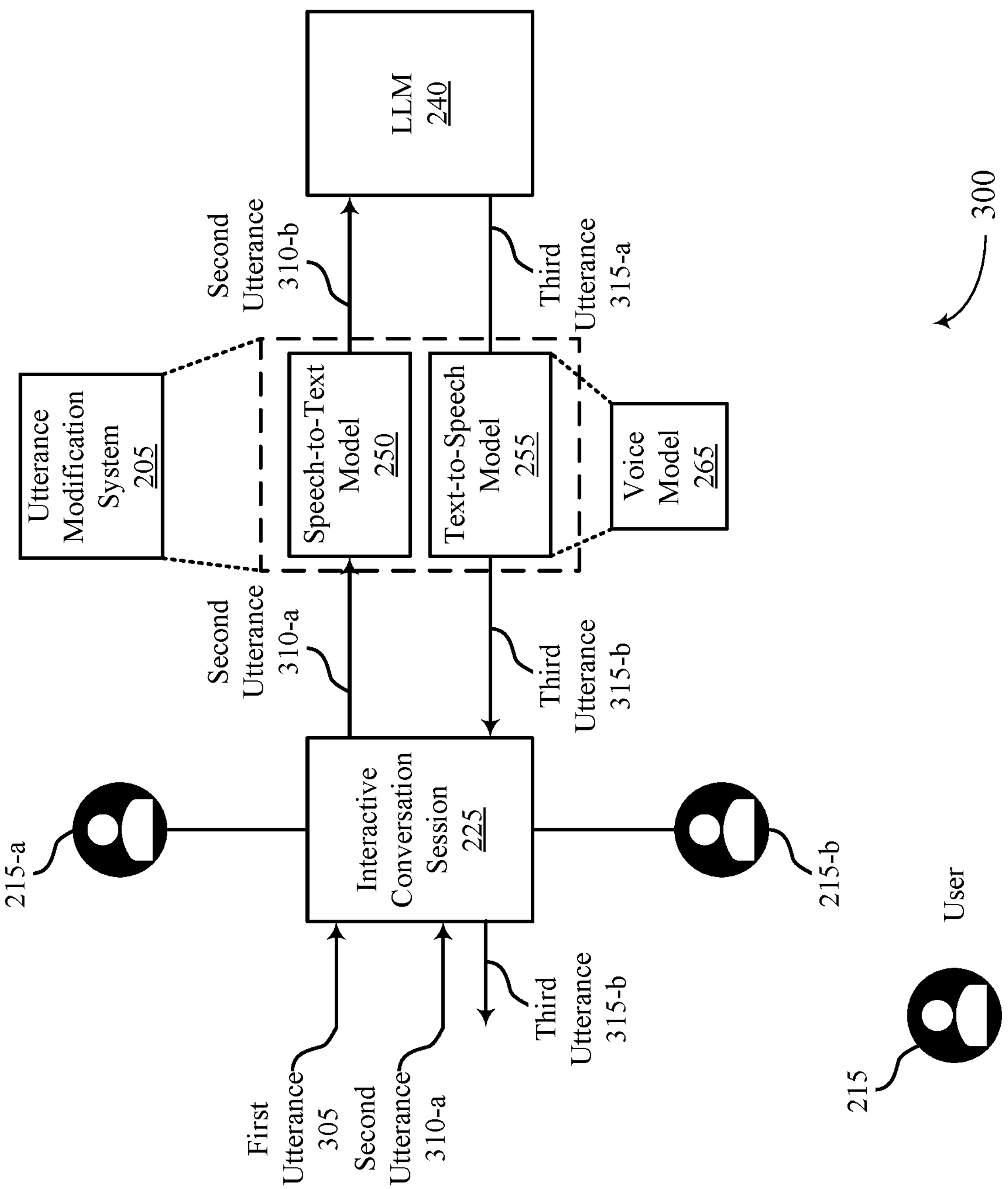
FIG. 3 shows an example of a flow diagram that supports real-time user response modifications for customer interactions in accordance with aspects of the present disclosure.

FIG. 3 shows an example of a flow diagram 300 that supports real-time user response modifications for customer interactions in accordance with aspects of the present disclosure. In some examples, the flow diagram 300 may implement or may be implemented by the system 100, the computing system 200, or both. For example, the flow diagram may include an utterance modification system 205 interfaced with an interactive conversation session 225 of a communication platform between users 215 (e.g., a user 215-*a* and a user 215-*b*) and interfaced with an LLM 240 as described with reference to FIG. 2. Further, the utterance modification system 205 may include a speech-to-text model 250, a text-to-speech model 255, and a voice model 265 associated with the text-to-speech model 255 as described with reference to FIG. 2.

In some examples, during the interactive conversation session 225 between the user 215-*a* and the user 215-*b*, the user 215-*a* and the user 215-*b* may exchange one or more utterances between each other. An utterance may be an example of a spoken word or statement expressed by a respective user 215. For example, during the interactive conversation session 225, the user 215-*a* may utter a first utterance 305 to the user 215-*b*. Further, the user 215-*b* may utter a second utterance 310 (e.g., a second utterance 310-*a*) to the user 215-*a* in response to the first utterance 305. Further, the second utterance 310 may include a first set of content or information that is in response to the first utterance 305. In some examples, the second utterance 310-*a* may be a version of the second utterance 310 that is in a first natural language format. Moreover, if the second utterance 310-*a* is in the first natural language format, the first set of content included in the second utterance 310-*a* may be in the first natural language format. For example, if the interactive conversation session 225 is a telephone call between the user 215-*a* and the user 215-*b*, the first natural language format may be a speech-based format such that the user 215-*a* and the user 215-*b* vocalize the first utterance 305 and the second utterance 310-*a* respectively.

In some cases, the user 215-*b* may be a customer service representative that is instructed to maintain a target user tone (e.g., a polite and professional tone) when conversing with customers (e.g., the user 215-*a*). For example, during the interactive conversation session 225, the user 215-*b* may attempt to maintain the target user tone when responding to the first utterance 305 with the second utterance 310 (e.g., the second utterance 310-*a*). However, in some cases, the second utterance 310-*a* may be associated with a tone that is different from and inconsistent with the target user tone. Therefore, the user 215-*b* may use the utterance modification system 205 in order to ensure that the response to the first utterance 305 is in accordance with the target user tone.

In some examples, as described with reference to FIG. 2, the utterance modification system 205 may establish an interface between the utterance modification system 205 and the communication platform that hosts interactive conversation session 225. Using the established interface, the utterance modification system 205 may receive the second utterance 310-*a* that is uttered by the user 215-*a* during the interactive conversation session 225 in response to the first utterance 305. In some examples, if the second utterance 310-*a* is in the first natural language format, the second utterance 310-*a* may be sent from the interactive conversation session 225 to the speech-to-text model 250 of the utterance modification system 205. The speech-to-text model 250 of the utterance modification system 205 may be used to convert the second utterance 310-*a* that is in the first natural language format (e.g., the speech-based format) into a version of the second utterance 310 (e.g., a second utterance 310-*b*) that is in a second natural language form (e.g., a text-based format). The second utterance 310 may be converted from the first natural language format into the second natural language format such that content of the second utterance 310 (e.g., the first set of content) can be modified to ensure that the content of the response to the first utterance 305 is in accordance with the target user tone.

To modify the first set of content of the second utterance 310, the utterance modification system 205 may transmit a prompt to the LLM 240 that includes the second utterance 310-*b* and one or more prompt parameters associated with the user 215-*b*. The one or more prompt parameters may represent instructions for the LLM 240 to modify the second utterance 310. For example, the one or more prompt parameters may include a tone parameter, a response length parameter, a conversation timing parameter, or any combination thereof, as further described elsewhere herein with reference to FIG. 2. Using the prompt and the one or more prompt parameters, the LLM 240 may generate a third utterance 315 that is in the second natural language format (e.g., a third utterance 315-*a*). The third utterance 315-*a* may include a second set of data that is based on but different from the first set of data included in the second utterance 310. Further, the second set of data may be associated with the target user tone that is based on the one or more prompt parameters. Therefore, the second set of data included in the third utterance 315-*a* may respond to the first utterance 305 in accordance with the target user tone. Thus, the LLM 240 may modify the content of the second utterance 310 when generating the third utterance 315.

After generating the third utterance 315-*a*, the LLM 240 may transmit the third utterance 315-*a* to the text-to-speech model 255 of the utterance modification system 205 for the third utterance 315 to be converted from the second natural language format to the first natural language format (e.g., be converted from the third utterance 315-*a* to a third utterance 315-*b*. The text-to-speech model 255 may use a voice model 265 to convert the third utterance 315-*a* from the text-based format generated by the LLM 240 to the speech-based format of the interactive conversation session 225. In some examples, the voice model 265 may be associated with the user 215-*b* such that when the utterance modification system 205 transmits the third utterance 315-*b* to the interactive conversation session 225, the user 215-*a* receives the third utterance 315-*b* as if the third utterance 315-*b* was uttered by the user 215-*b*. That is, the voice model 265 may be an ML model trained to mimic the voice of the user 215-*b* and vocalize utterances (e.g., the third utterance 315-*b*) to users 215 in the voice of the user 215-*b*. In some examples, the voice model 265 may be referred to as a deepfake model. A deepfake may be an AI generated form of media that is manipulated to replicate the likeness of a user 215. Therefore, the voice model 265 may use AI/ML techniques to replicate the voice of the user 215-*b* and paraphrase an impolite or angry response (e.g., the second utterance 310) into a professional, kind, and helpful answer (e.g., the third utterance 315) that allows a customer (e.g., the user 215-*a*) receive a response in a more desirable and appropriate tone.

In some examples, prior to using the utterance modification system 205, the user 215-*b* may train the voice model 265 to replicate the voice of the user 215-*b*. To train the voice model 265, the user 215-*b* may read and utter various pieces of text to the voice model 265. The voice model 265 may then use the utterances from the user 215-*b* to learn the inflection and tone of the voice of the user 215-*b*. In some examples, the text used to train the voice model 265 may be related to uses of the utterance modification system 205. For example, if the utterance modification system 205 is used by a customer service representative (e.g., the user 215-*b*), the user 215-*b* may utter text related to customer service interactions and the organization that the user 215-*b* is a part of. Further, the text used for the training may include the user 215-*b* uttering various phrases such that the voice model 265 receives various samples of the voice of the user 215-*b* uttering the phonetic properties of the language used by the user 215-*b*. For example, the training text may include various phrases and text portions that enable the user 215-*b* to utter each phonetic combination within the language used by the user 215-*b*. Therefore, based on the training of the voice model 265, the voice model 265 may become associated with the user 215-*b*. Further, in some examples, the text-to-speech model 255 may include a set of voice models 265 for one or more users 215. For example, an organization using the utterance modification system 205 may have a separate voice model 265 for each customer service representative within the organization. Thus, the individual customer service representatives may be capable of using a personalized voice model 265 to utter responses and utterances (e.g., the third utterance 315) generated by the LLM 240. Additionally, or alternatively, the voice model 265 may enable the user 215-*a* to receive the third utterance 315 from the user 215-*b* in near real time in such a way that the user 215-*a* receives a polite a helpful response even though the user 215-*b* initially responded in an unprofessional manner.

Therefore, users 215 may use the utterance modification system 205 to generate personalized responses and utterances that maintain a configured target user tone. For example, based on the training of the voice model 265 and the utterance modification system 205, the user 215-*b* may be capable of using the utterance modification system 205 to translate the wording and tone of the second utterance 310 into the third utterance 315. That is, the third utterance 315 may include similar content as the second utterance 310 but different wording and tone. Therefore, the second set of content of the third utterance 315 may be based on the first set of content of the second utterance 310 but the LLM 240 may change the delivery, tone, choice of words, or any combination thereof when generating the third utterance 315 to be sent to the user 215-*a* via the text-to-speech model 255 and the voice model 265.

In some cases, when receiving utterances (e.g., the second utterance 310 and the third utterance 315) the speech-to-text model 250 and the text-to-speech model 255 may operate on a per-sentence basis. For example, after the user 215-*b* utters a sentence, the sentence may be transmitted to the speech-to-text model 250 and then to the LLM 240 to change the content and tone of the sentence. Further, the sentence generated by the LLM 240 may then be transmitted to the text-to-speech model 255 and the voice model 265 to be received and heard by the user 215-*a* as if the user 215-*b* uttered the sentence. Moreover, the LLM 240 may store both the initial utterance or sentence (e.g., the second utterance 310) and the generated utterance or sentence (e.g., the third utterance 315) to be used for generating subsequent utterances. For example, the LLM 240 may store the first sentence such that the second sentence is generated in a manner that flows as normal human speech. Further, in some other cases, the user 215-*b* may use a conversation timing parameter from the one or more prompt parameters to determine how much content the LLM 240 may receive before generating the third utterance 315. Description of the conversation timing parameter may be described elsewhere herein, such as with reference to FIG. 2.

Further, in some examples, the speech-to-text model 250 of the utterance modification system 205 may receive the first utterance 305 from the user 215-*a* and generate a transcript for the user 215-*b*. Therefore, when conversing with the user 215-*a*, the user 215-*b* may be able to refer back to previous utterances from the user 215-*a*. In some cases, the utterance modification system 205 may also use the speech-to-text model 250 and the LLM 240 to generate a summary of the first utterance 305 for the user 215-*b*. For example, some customers (e.g., the user 215-*a*) may be frustrated when conversing with customer service representatives (e.g., the user 215-*b*) and the customer service representative may have some difficulty in assessing what the user 215-*a* is talking about and is requesting from the user 215-*b*. Therefore, the user 215-*b* may use the utterance modification system 205 and the LLM 240 to receive a summary of the first utterance 305 from the user 215-*a* in order to better assist the user 215-*a*. Additionally, or alternatively, the user 215-*b* may use the summary of the first utterance 305 in cases where the user 215-*b* may have not been listening to the user 215-*a* fully and may have missed portions of the first utterance 305.

Therefore, users 215 may use the aspects of the present disclosure described herein to ensure the responses are paraphrased and converted into a professional tone via the voice model 265 of the utterance modification system 205. Further, the utterance modification system 205 may reduce the signaling overhead and latency for the user 215-*b* to generate a more polite and professional response from an impolite response. By reducing such latency and establishing the interfaces between the communication platform 210 and the utterance modification system 205 and the LLM 240 and the utterance modification system 205, the techniques of the present disclosure may provide users 215 with an improved customer service experience. For example, customer service representatives (e.g., the user 215-*b*) may be capable of responding without holding back emotions and maintaining a target user tone as the utterance modification system 205 is capable of rephrasing the utterance of the customer service representative into an utterance that maintains the target user tone. Therefore, the utterance modification system 205 may reduce the overall burnout and emotional stress of customer service representatives enabling the customer service representatives to provide a higher level of service to customers, resulting in an increase in CSAT scores for customer service representatives and companies.

In some cases, customers (e.g., the user 215-*a*) may also receive an improved customer service experience by having the target user tone maintained at all times when conversing with customer service representatives. Therefore, the techniques of the present disclosure may provide for an improved user experience for both customers and customer service representatives by establishing interfaces between the utterance modification system 205 and the LLM 240 and communication platform 210 to enable modifications to utterances that match a target user tone. Further descriptions of the techniques of the present disclosure may be described elsewhere herein, such as with reference to FIG. 4.

Figure 4:
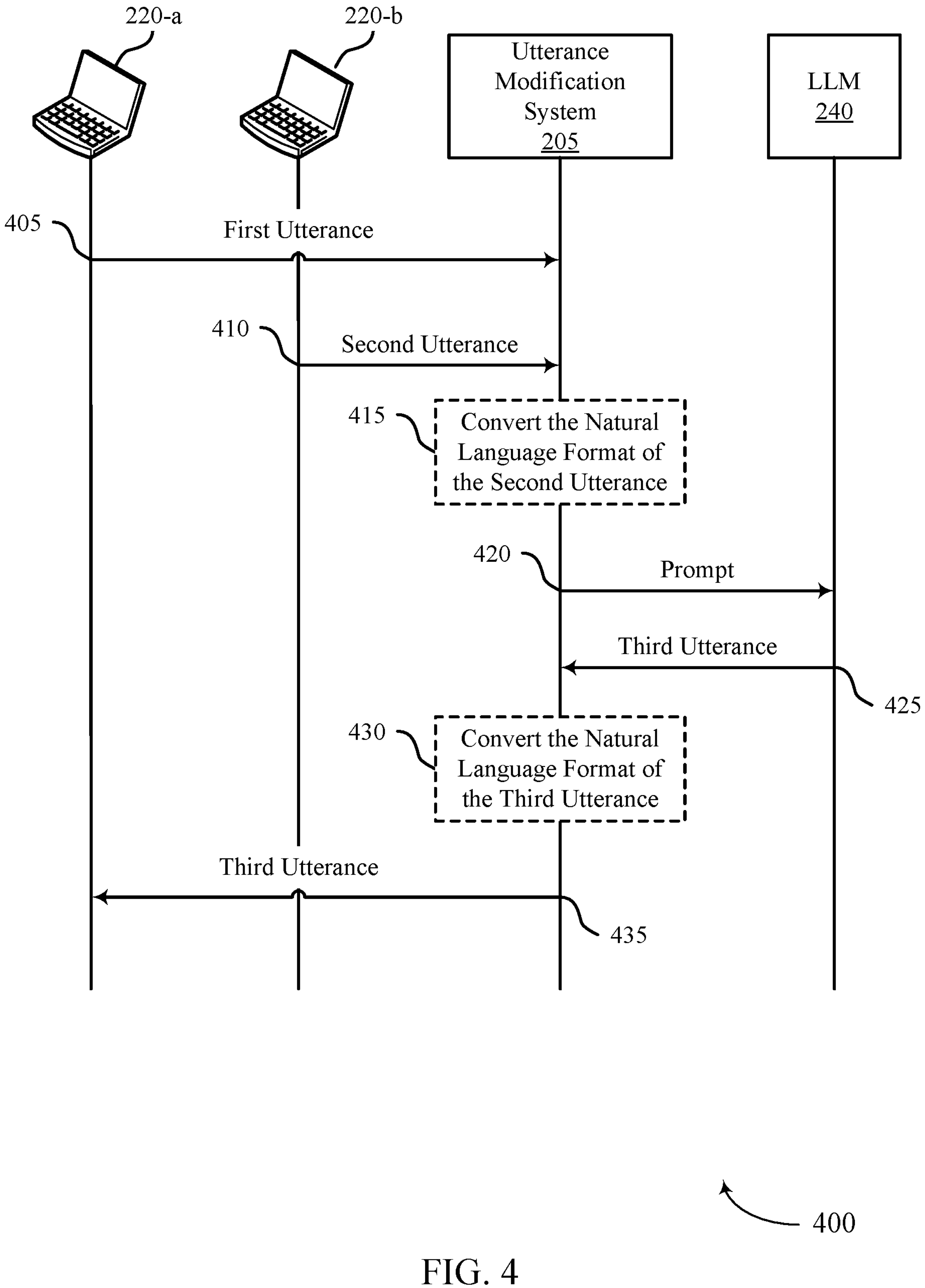
FIG. 4 shows an example of a process flow that supports real-time user response modifications for customer interactions in accordance with aspects of the present disclosure.

FIG. 4 shows an example of a process flow 400 that supports real-time user response modifications for customer interactions in accordance with aspects of the present disclosure. In some examples, the process flow 400 may implement or may be implemented by the system 100, the computing system 200, the flow diagram 300, or any combination thereof. The process flow may include the computing device 220-*a*, the computing device 220-*b*, the utterance modification system 205, and the LLM 240 which may be examples of devices or services described elsewhere herein including with reference to FIGS. 1 and 2. Further, one or more users 215 (e.g., the user 215-*a* and the user 215-*b*) may operate the computing device 220-*a* and the computing device 220-*b*, as described elsewhere herein with reference to FIGS. 2 and 3.

In the following description of the process flow 400, the operations may be performed by the computing device 220-*a*, the computing device 220-*b*, the utterance modification system 205, and the LLM 240 in different orders or at different times. Some operations may also be left out of the process flow 400, or other operations may be added. Although the process flow 400 may be described as being performed by the computing device 220-*a*, the computing device 220-*b*, the utterance modification system 205, and the LLM 240, some aspects of some operations may also be performed by other devices, services, or models described elsewhere herein including with reference to FIGS. 1 and 2.

At 405, the utterance modification system 205 may receive, from a first user 215 (e.g., the user 215-*a*) of the computing device 220-*a*, a first utterance during an interactive conversation session between the first user 215 and a second user 215 of the computing device 220-*b*. In some cases, the utterance modification system 205 may establish a first interface with a communication platform that hosts the interactive conversation session. Therefore, the utterance modification system 205 may receive the first utterance from the first user 215 and a second utterance from the second user 215 via the first interface, and utterance modification system 205 may transmit a third utterance to the first user 215 via the first interface. Further, the utterance modification system 205 may establish a second interface with the LLM 240. Thus, the utterance modification system 205 may transmit a prompt that includes the second utterance to the LLM 240 via the second interface and the utterance modification system 205 may receive the third utterance from the LLM 240 via the second interface.

At 410, the utterance modification system 205 may receive, from the second user 215 of the computing device 220-*b*, a second utterance that includes a first set of content. The utterance modification system 205 may receive the second utterance in response to the first utterance and during the interactive conversation session. In some examples, the utterance modification system may receive, from a user 215 via a user interface, a user input that adjusts one or more prompt parameters associated with the second user 215. Further, the target user tone may be adjusted based on the adjusted one or more prompt parameters. In some other examples, the utterance modification system 205 may receive, from the second user 215 of the computing device 220-*b*, a set of utterances during one or more different interactive conversation sessions. In response, the LLM 240 may generate a set of modified utterances. Further, the utterance modification system 205 may receive, from the second user 215 of the computing device 220-*b*, a user input that modifies or accepts the set of modified utterances. Moreover, the utterance modification system 205 may generate the one or more prompt parameters based on the user input of the second user 215. Additionally, or alternatively, the set of utterances and the set of modified utterances may be in a second natural language format that is a text-based natural language format. Further, in some examples, at 415, the utterance modification system 205 may convert, via a speech-to-text model of the utterance modification system 205, the second utterance from a first natural language format to a second natural language format that is different from the first natural language format. Further, in some cases, the first natural language format may be a speech-based natural language format and the second natural language format may be a text-based natural language format.

At 420, the utterance modification system 205 may transmit, to the LLM 240, the prompt that includes the second utterance and one or more prompt parameters associated with the second user 215. In some examples, the one or more prompt parameters may include a tone parameter, a response length parameter, a conversation timing parameter, or any combination thereof. Further, in some cases, the prompt transmitted to the LLM 240 may include the second utterance in the second natural language format.

At 425, the utterance modification system 205 may receive, from the LLM 240, a third utterance including a second set of content in response to the prompt. Further, the second set of content may be based on the first set of content and may be associated with a target user tone that is based on the one or more prompt parameters. In some examples, at 430, the utterance modification system 205 may convert, via a text-to-speech model, the third utterance from the second natural language format to the first natural language format via a text-to-speech model of the utterance modification system 205. Therefore, the utterance modification system 205 may transmit, to the first user 215 of the computing device 220-*a*, the third utterance in the first natural language format. In some examples, the utterance modification system 205 may transmit the third utterance to a voice model of the text-to-speech model. Thus, the utterance modification system 205 may convert the third utterance from the second natural language format to the first natural language format via the voice model of the text-to-speech model. In some cases, the voice model of the text-to-speech model may be associated with the second user 215. Further, in some examples, for training the voice model, the utterance modification system 205 may receive, from the second user 215 of the computing device 220-*b*, a set of utterances. Therefore, the utterance modification system 205 may train the voice model based on receiving the set of utterances such that the voice model is associated with the second user 215. Additionally, or alternatively, the text-to-speech model may include one or more voice models that are each associated with a respective user 215 of a set of users 215. Therefore, at 435, the third utterance may be transmitted to the first user 215 in response to the first utterance during the interactive conversation session.

Figure 5:
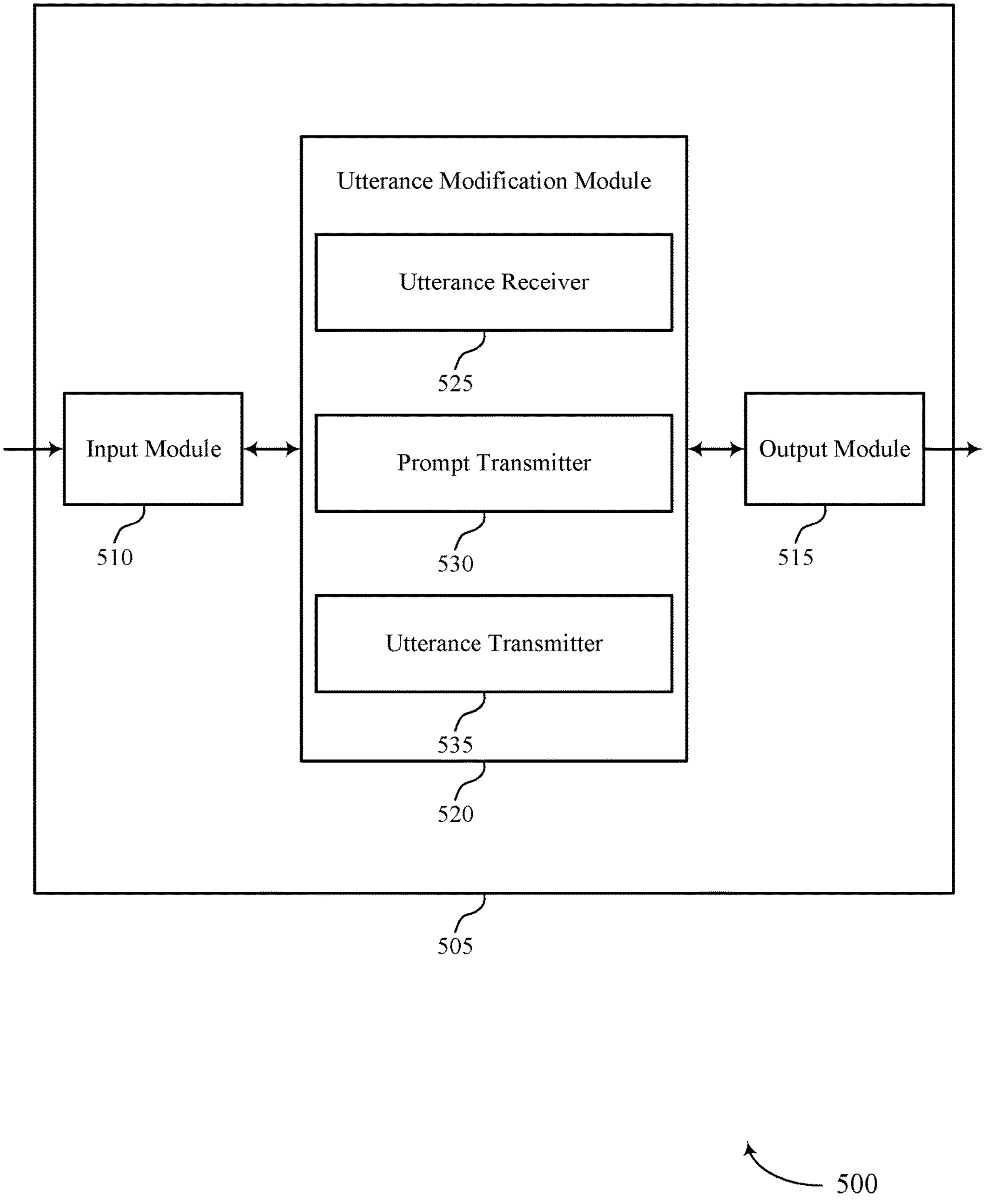
FIG. 5 shows a block diagram of an apparatus that supports real-time user response modifications for customer interactions in accordance with aspects of the present disclosure.

FIG. 5 shows a block diagram 500 of a device 505 that supports real-time user response modifications for customer interactions in accordance with aspects of the present disclosure. The device 505 may include an input module 510, an output module 515, and an utterance modification module 520. The device 505, or one or more components of the device 505 (e.g., the input module 510, the output module 515, the utterance modification module 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the utterance modification module 520 to support real-time user response modifications for customer interactions. In some cases, the input module 510 may be a component of an input/output (I/O) controller 710 as described with reference to FIG. 7.

The output module 515 may manage output signals for the device 505. For example, the output module 515 may receive signals from other components of the device 505, such as the utterance modification module 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the utterance modification module 520 may include an utterance receiver 525, a prompt transmitter 530, an utterance transmitter 535, or any combination thereof. In some examples, the utterance modification module 520, or various components thereof, may be configured to perform various operations (e.g., receiving, monitoring, transmitting) using or otherwise in cooperation with the input module 510, the output module 515, or both. For example, the utterance modification module 520 may receive information from the input module 510, send information to the output module 515, or be integrated in combination with the input module 510, the output module 515, or both to receive information, transmit information, or perform various other operations as described herein.

The utterance modification module 520 may support data processing in accordance with examples as disclosed herein. The utterance receiver 525 may be configured to support receiving, from a first user, a first utterance during an interactive conversation session between the first user and a second user. The utterance receiver 525 may be configured to support receiving, from a second user in response to the first utterance and during the interactive conversation session, a second utterance including a first set of content. The prompt transmitter 530 may be configured to support transmitting, to an LLM, a prompt including the second utterance and one or more prompt parameters associated with the second user. The utterance receiver 525 may be configured to support receiving, from the LLM in response to the prompt, a third utterance including a second set of content that is based on the first set of content, the second set of content being associated with a target user tone that is based on the one or more prompt parameters. The utterance transmitter 535 may be configured to support transmitting, to the first user in response to the first utterance, the third utterance during the interactive conversation session.

Figure 6:
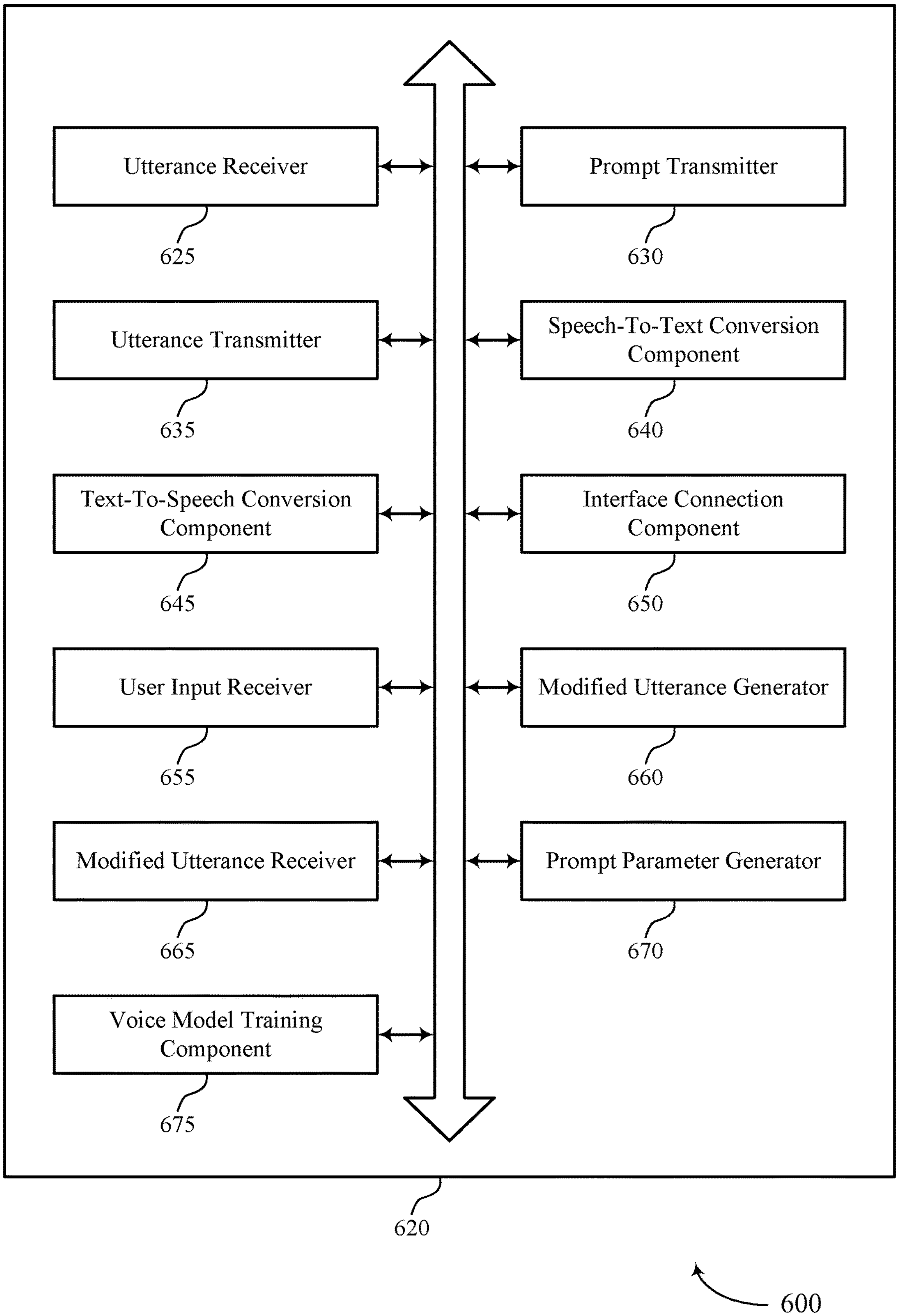
FIG. 6 shows a block diagram of an utterance modification module that supports real-time user response modifications for customer interactions in accordance with aspects of the present disclosure.

FIG. 6 shows a block diagram 600 of an utterance modification module 620 that supports real-time user response modifications for customer interactions in accordance with aspects of the present disclosure. The utterance modification module 620 may be an example of aspects of an utterance modification module or an utterance modification module 520, or both, as described herein. The utterance modification module 620, or various components thereof, may be an example of means for performing various aspects of real-time user response modifications for customer interactions as described herein. For example, the utterance modification module 620 may include an utterance receiver 625, a prompt transmitter 630, an utterance transmitter 635, a speech-to-text conversion component 640, a text-to-speech conversion component 645, an interface connection component 650, a user input receiver 655, a modified utterance generator 660, a modified utterance receiver 665, a prompt parameter generator 670, a voice model training component 675, or any combination thereof. Each of these components, or components of subcomponents thereof (e.g., one or more processors, one or more memories), may communicate, directly or indirectly, with one another (e.g., via one or more buses).

The utterance modification module 620 may support data processing in accordance with examples as disclosed herein. The utterance receiver 625 may be configured to support receiving, from a first user, a first utterance during an interactive conversation session between the first user and a second user. In some examples, the utterance receiver 625 may be configured to support receiving, from a second user in response to the first utterance and during the interactive conversation session, a second utterance including a first set of content. The prompt transmitter 630 may be configured to support transmitting, to an LLM, a prompt including the second utterance and one or more prompt parameters associated with the second user. In some examples, the utterance receiver 625 may be configured to support receiving, from the LLM in response to the prompt, a third utterance including a second set of content that is based on the first set of content, the second set of content being associated with a target user tone that is based on the one or more prompt parameters. The utterance transmitter 635 may be configured to support transmitting, to the first user in response to the first utterance, the third utterance during the interactive conversation session.

In some examples, the speech-to-text conversion component 640 may be configured to support converting, via a speech-to-text model of the utterance modification system, the second utterance from a first natural language format to a second natural language format that is different from the first natural language format, where the prompt transmitted to the LLM includes the second utterance in the second natural language format. In some examples, the text-to-speech conversion component 645 may be configured to support converting, via a text-to-speech model of the utterance modification system, the third utterance from the second natural language format to the first natural language format, where the third utterance transmitted during the interactive conversation session is in the first natural language format.

In some examples, to support converting the third utterance from the second natural language format to the first natural language format, the text-to-speech conversion component 645 may be configured to support transmitting the third utterance, to a voice model of the text-to-speech model. The third utterance being converted from the second natural language format to the first natural language format via the voice model of the text-to-speech model, where the voice model of the text-to-speech model is associated with the second user.

In some examples, the utterance receiver 625 may be configured to support receiving, from the second user, a set of multiple utterances for training the voice model. In some examples, the voice model training component 675 may be configured to support training the voice model in accordance with the set of multiple utterances based on receiving the set of multiple utterances such that the voice model is associated with the second user.

In some examples, the text-to-speech model includes one or more voice models each associated with a respective user of a set of multiple users.

In some examples, the first natural language format is a speech based natural language format and the second natural language format is a text based natural language format.

In some examples, the interface connection component 650 may be configured to support establishing a first interface between the utterance modification system and a communication platform that the interactive conversation session is hosted on, where the first utterance is received from the first user via the first interface, the second utterance is received from the second user via the first interface, and the third utterance is transmitted to the first user via the first interface. In some examples, the interface connection component 650 may be configured to support establishing a second interface between the utterance modification system and the LLM, where the prompt including the second utterance is transmitted to the LLM via the second interface and the third utterance is received from the LLM via the second interface.

In some examples, the user input receiver 655 may be configured to support receiving, via a user interface, a user input that adjusts the one or more prompt parameters associated with the second user, where the target user tone is adjusted based on the adjusted one or more prompt parameters.

In some examples, the one or more prompt parameters include a tone parameter, a response length parameter, a conversation timing parameter, or any combination thereof.

In some examples, the utterance receiver 625 may be configured to support receiving, from the second user, a set of multiple utterances during one or more of a set of multiple different interactive conversation sessions. In some examples, the modified utterance generator 660 may be configured to support generating, using the LLM, a set of multiple modified utterances. In some examples, the modified utterance receiver 665 may be configured to support receiving, from the second user, a user input that modifies or accepts the set of multiple modified utterances. In some examples, the prompt parameter generator 670 may be configured to support generating, based on the user input, the one or more prompt parameters.

In some examples, the set of multiple utterances and the set of multiple modified utterances are in a second natural language format that is a text based natural language format.

Figure 7:
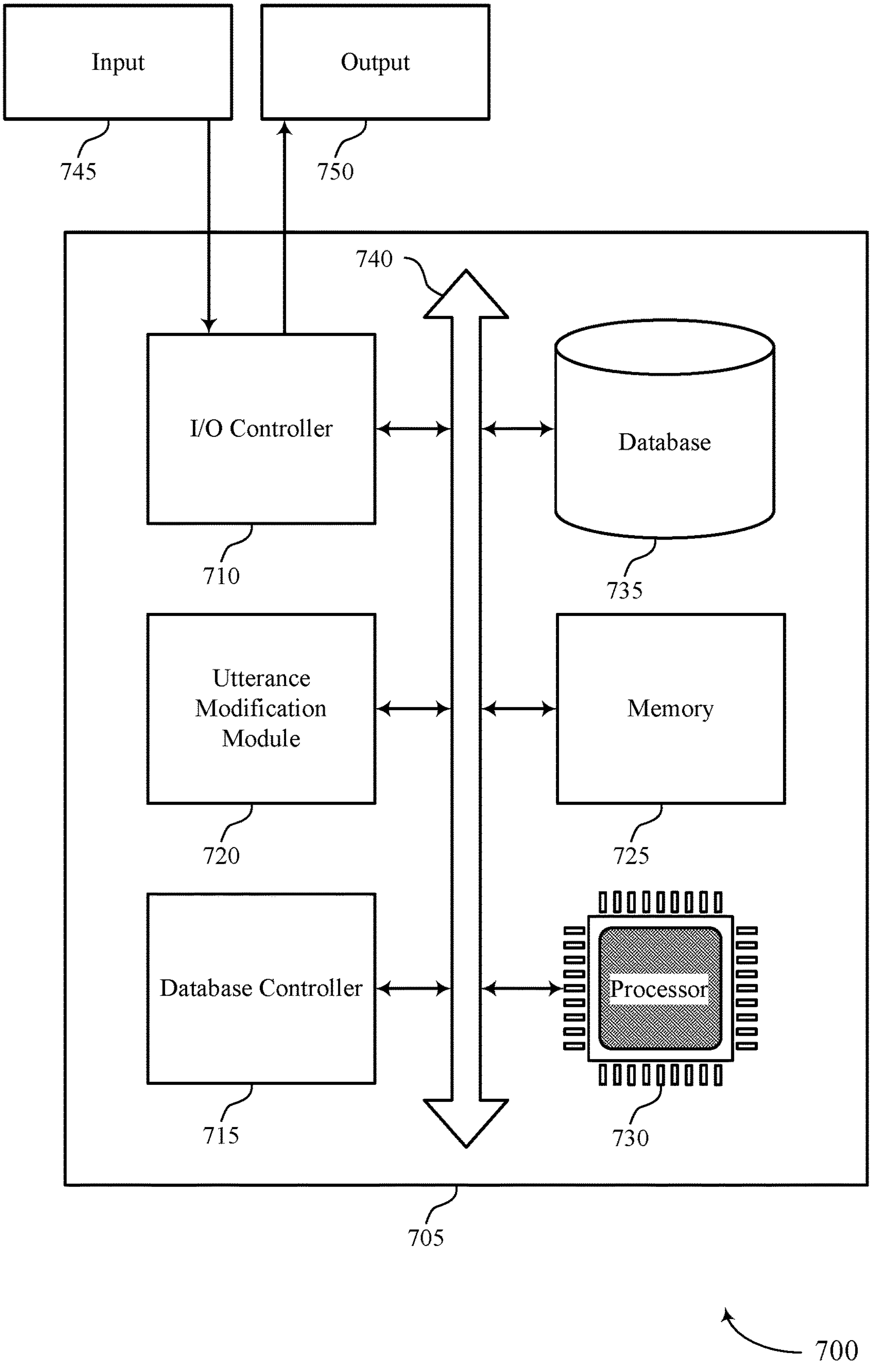
FIG. 7 shows a diagram of a system including a device that supports real-time user response modifications for customer interactions in accordance with aspects of the present disclosure.

FIG. 7 shows a diagram of a system 700 including a device 705 that supports real-time user response modifications for customer interactions in accordance with aspects of the present disclosure. The device 705 may be an example of or include components of a device 505 as described herein. The device 705 may include components for bi-directional data communications including components for transmitting and receiving communications, such as an utterance modification module 720, an I/O controller, such as an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause at least one processor 730 to perform various functions described herein. In some cases, the memory 725 may contain, among other things, a basic I/O system (BIOS) which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting real-time user response modifications for customer interactions). The processor 730 may be an example of a single processor or multiple processors. For example, the device 705 may include one or more processors 730.

The utterance modification module 720 may support data processing in accordance with examples as disclosed herein. For example, the utterance modification module 720 may be configured to support receiving, from a first user, a first utterance during an interactive conversation session between the first user and a second user. The utterance modification module 720 may be configured to support receiving, from a second user in response to the first utterance and during the interactive conversation session, a second utterance including a first set of content. The utterance modification module 720 may be configured to support transmitting, to an LLM, a prompt including the second utterance and one or more prompt parameters associated with the second user. The utterance modification module 720 may be configured to support receiving, from the LLM in response to the prompt, a third utterance including a second set of content that is based on the first set of content, the second set of content being associated with a target user tone that is based on the one or more prompt parameters. The utterance modification module 720 may be configured to support transmitting, to the first user in response to the first utterance, the third utterance during the interactive conversation session.

By including or configuring the utterance modification module 720 in accordance with examples as described herein, the device 705 may support techniques for an utterance modification system that connects multiple models to enable users to use an LLM to make a response match a target user tone to support improved communication reliability, reduced latency, improved coordination between devices and services, and improved utilization of processing capability.

Figure 8:
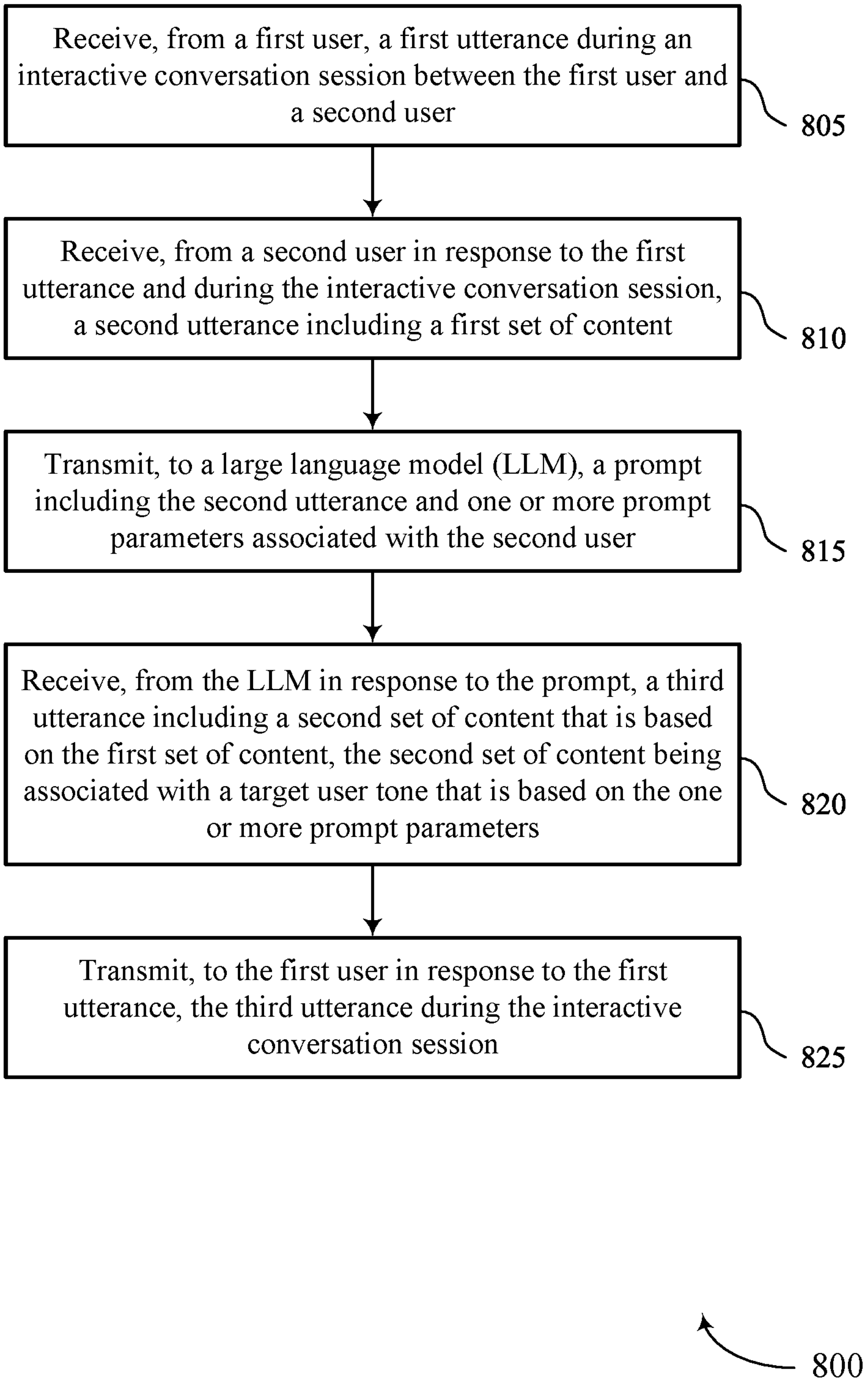
FIGS. 8 through 10 show flowcharts illustrating methods that support real-time user response modifications for customer interactions in accordance with aspects of the present disclosure.

FIG. 8 shows a flowchart illustrating a method 800 that supports real-time user response modifications for customer interactions in accordance with aspects of the present disclosure. The operations of the method 800 may be implemented by an utterance modification system or its components as described herein. For example, the operations of the method 800 may be performed by an utterance modification system as described with reference to FIGS. 1 through 7. In some examples, an utterance modification system may execute a set of instructions to control the functional elements of the utterance modification system to perform the described functions. Additionally, or alternatively, the utterance modification system may perform aspects of the described functions using special-purpose hardware.

At 805, the method may include receiving, from a first user, a first utterance during an interactive conversation session between the first user and a second user. The operations of 805 may be performed in accordance with examples as disclosed herein. In some examples, aspects of the operations of 805 may be performed by an utterance receiver 625 as described with reference to FIG. 6.

At 810, the method may include receiving, from a second user in response to the first utterance and during the interactive conversation session, a second utterance including a first set of content. The operations of 810 may be performed in accordance with examples as disclosed herein. In some examples, aspects of the operations of 810 may be performed by an utterance receiver 625 as described with reference to FIG. 6.

At 815, the method may include transmitting, to an LLM, a prompt including the second utterance and one or more prompt parameters associated with the second user. The operations of 815 may be performed in accordance with examples as disclosed herein. In some examples, aspects of the operations of 815 may be performed by a prompt transmitter 630 as described with reference to FIG. 6.

At 820, the method may include receiving, from the LLM in response to the prompt, a third utterance including a second set of content that is based on the first set of content, the second set of content being associated with a target user tone that is based on the one or more prompt parameters. The operations of 820 may be performed in accordance with examples as disclosed herein. In some examples, aspects of the operations of 820 may be performed by an utterance receiver 625 as described with reference to FIG. 6.

At 825, the method may include transmitting, to the first user in response to the first utterance, the third utterance during the interactive conversation session. The operations of 825 may be performed in accordance with examples as disclosed herein. In some examples, aspects of the operations of 825 may be performed by an utterance transmitter 635 as described with reference to FIG. 6.

Figure 9:
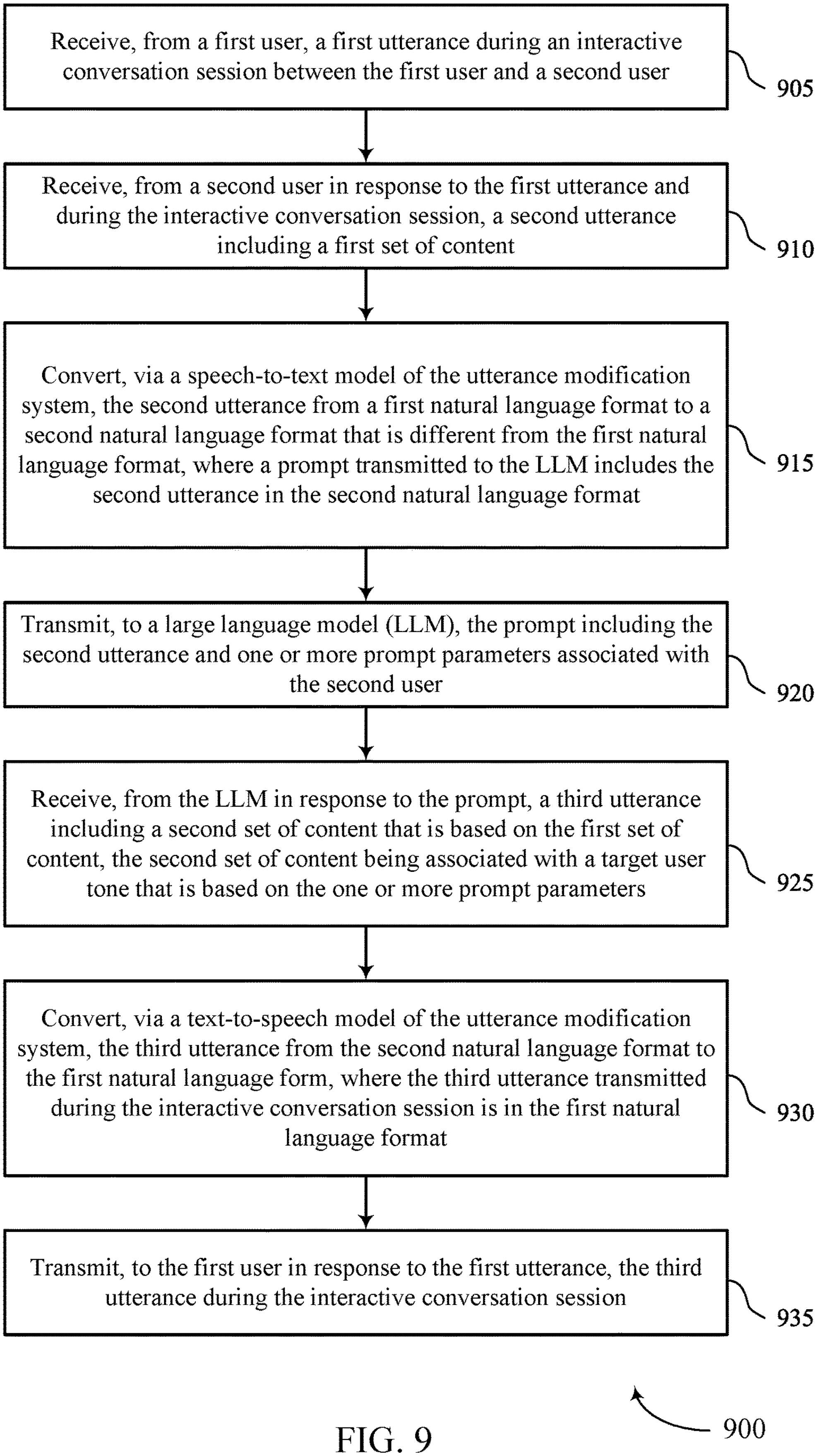

FIG. 9 shows a flowchart illustrating a method 900 that supports real-time user response modifications for customer interactions in accordance with aspects of the present disclosure. The operations of the method 900 may be implemented by an utterance modification system or its components as described herein. For example, the operations of the method 900 may be performed by an utterance modification system as described with reference to FIGS. 1 through 7. In some examples, an utterance modification system may execute a set of instructions to control the functional elements of the utterance modification system to perform the described functions. Additionally, or alternatively, the utterance modification system may perform aspects of the described functions using special-purpose hardware.

At 905, the method may include receiving, from a first user, a first utterance during an interactive conversation session between the first user and a second user. The operations of 905 may be performed in accordance with examples as disclosed herein. In some examples, aspects of the operations of 905 may be performed by an utterance receiver 625 as described with reference to FIG. 6.

At 910, the method may include receiving, from a second user in response to the first utterance and during the interactive conversation session, a second utterance including a first set of content. The operations of 910 may be performed in accordance with examples as disclosed herein. In some examples, aspects of the operations of 910 may be performed by an utterance receiver 625 as described with reference to FIG. 6.

At 915, the method may include converting, via a speech-to-text model of the utterance modification system, the second utterance from a first natural language format to a second natural language format that is different from the first natural language format, where the prompt transmitted to the LLM includes the second utterance in the second natural language format. The operations of 915 may be performed in accordance with examples as disclosed herein. In some examples, aspects of the operations of 915 may be performed by a speech-to-text conversion component 640 as described with reference to FIG. 6.

At 920, the method may include transmitting, to an LLM, a prompt including the second utterance and one or more prompt parameters associated with the second user. The operations of 920 may be performed in accordance with examples as disclosed herein. In some examples, aspects of the operations of 920 may be performed by a prompt transmitter 630 as described with reference to FIG. 6.

At 925, the method may include receiving, from the LLM in response to the prompt, a third utterance including a second set of content that is based on the first set of content, the second set of content being associated with a target user tone that is based on the one or more prompt parameters. The operations of 925 may be performed in accordance with examples as disclosed herein. In some examples, aspects of the operations of 925 may be performed by an utterance receiver 625 as described with reference to FIG. 6.

At 930, the method may include converting, via a text-to-speech model of the utterance modification system, the third utterance from the second natural language format to the first natural language form, where the third utterance transmitted during the interactive conversation session is in the first natural language format. The operations of 930 may be performed in accordance with examples as disclosed herein. In some examples, aspects of the operations of 930 may be performed by a text-to-speech conversion component 645 as described with reference to FIG. 6.

At 935, the method may include transmitting, to the first user in response to the first utterance, the third utterance during the interactive conversation session. The operations of 935 may be performed in accordance with examples as disclosed herein. In some examples, aspects of the operations of 935 may be performed by an utterance transmitter 635 as described with reference to FIG. 6.

Figure 10:
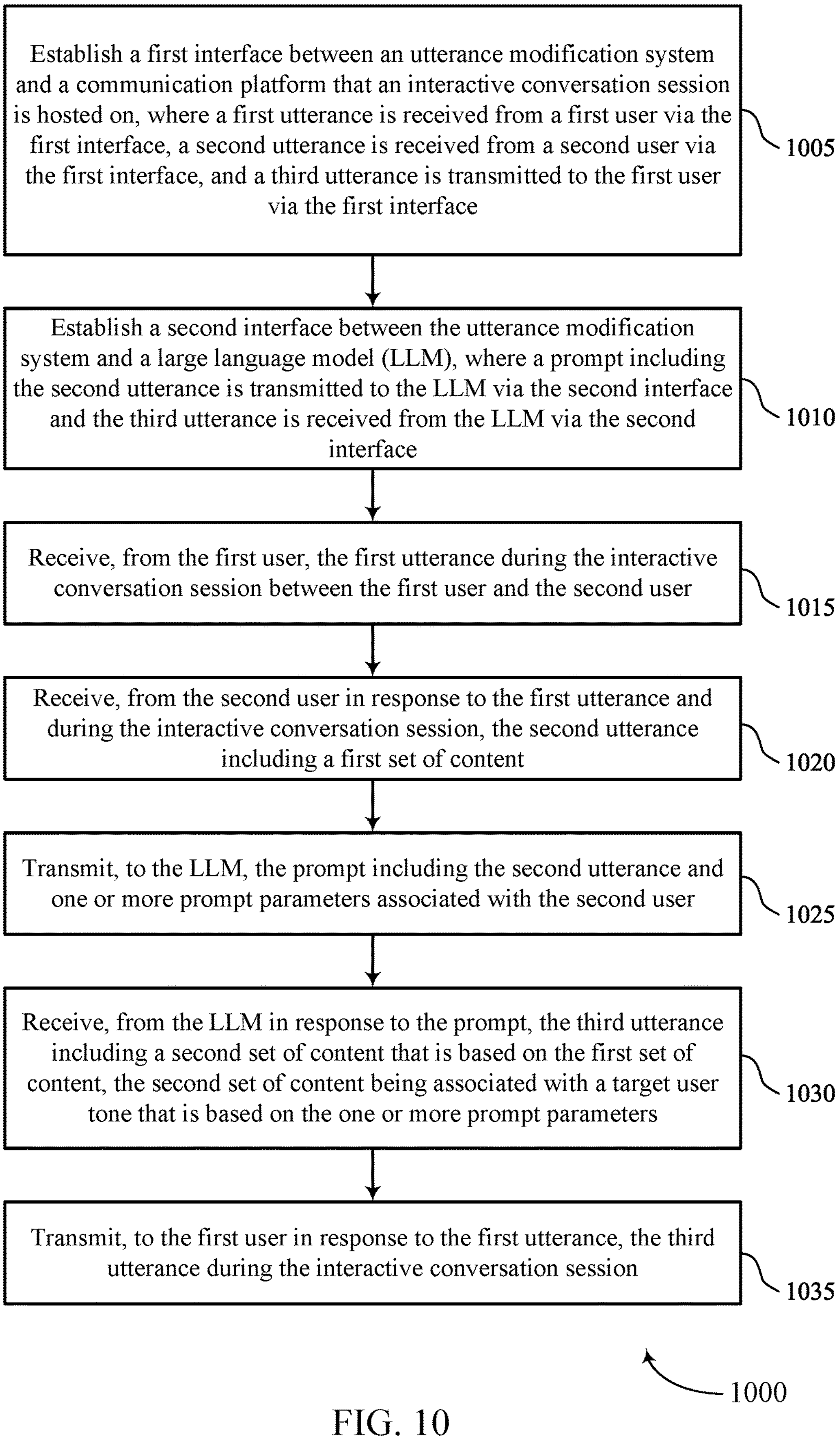

FIG. 10 shows a flowchart illustrating a method 1000 that supports real-time user response modifications for customer interactions in accordance with aspects of the present disclosure. The operations of the method 1000 may be implemented by an utterance modification system or its components as described herein. For example, the operations of the method 1000 may be performed by an utterance modification system as described with reference to FIGS. 1 through 7. In some examples, an utterance modification system may execute a set of instructions to control the functional elements of the utterance modification system to perform the described functions. Additionally, or alternatively, the utterance modification system may perform aspects of the described functions using special-purpose hardware.

At 1005, the method may include establishing a first interface between an utterance modification system and a communication platform that an interactive conversation session is hosted on, where a first utterance is received from a first user via the first interface, a second utterance is received from a second user via the first interface, and a third utterance is transmitted to the first user via the first interface. The operations of 1005 may be performed in accordance with examples as disclosed herein. In some examples, aspects of the operations of 1005 may be performed by an interface connection component 650 as described with reference to FIG. 6.

At 1010, the method may include establishing a second interface between the utterance modification system and an LLM, where a prompt including the second utterance is transmitted to the LLM via the second interface and the third utterance is received from the LLM via the second interface. The operations of 1010 may be performed in accordance with examples as disclosed herein. In some examples, aspects of the operations of 1010 may be performed by an interface connection component 650 as described with reference to FIG. 6.

At 1015, the method may include receiving, from the first user, the first utterance during the interactive conversation session between the first user and the second user. The operations of 1015 may be performed in accordance with examples as disclosed herein. In some examples, aspects of the operations of 1015 may be performed by an utterance receiver 625 as described with reference to FIG. 6.

At 1020, the method may include receiving, from the second user in response to the first utterance and during the interactive conversation session, the second utterance including a first set of content. The operations of 1020 may be performed in accordance with examples as disclosed herein. In some examples, aspects of the operations of 1020 may be performed by an utterance receiver 625 as described with reference to FIG. 6.

At 1025, the method may include transmitting, to the LLM, the prompt including the second utterance and one or more prompt parameters associated with the second user. The operations of 1025 may be performed in accordance with examples as disclosed herein. In some examples, aspects of the operations of 1025 may be performed by a prompt transmitter 630 as described with reference to FIG. 6.

At 1030, the method may include receiving, from the LLM in response to the prompt, the third utterance including a second set of content that is based on the first set of content, the second set of content being associated with a target user tone that is based on the one or more prompt parameters. The operations of 1030 may be performed in accordance with examples as disclosed herein. In some examples, aspects of the operations of 1030 may be performed by an utterance receiver 625 as described with reference to FIG. 6.

At 1035, the method may include transmitting, to the first user in response to the first utterance, the third utterance during the interactive conversation session. The operations of 1035 may be performed in accordance with examples as disclosed herein. In some examples, aspects of the operations of 1035 may be performed by an utterance transmitter 635 as described with reference to FIG. 6.

A method for data processing by an utterance modification system is described. The method may include receiving, from a first user, a first utterance during an interactive conversation session between the first user and a second user, receiving, from a second user in response to the first utterance and during the interactive conversation session, a second utterance including a first set of content, transmitting, to an LLM, a prompt including the second utterance and one or more prompt parameters associated with the second user, receiving, from the LLM in response to the prompt, a third utterance including a second set of content that is based on the first set of content, the second set of content being associated with a target user tone that is based on the one or more prompt parameters, and transmitting, to the first user in response to the first utterance, the third utterance during the interactive conversation session.

An utterance modification system for data processing is described. The utterance modification system may include one or more memories storing processor executable code, and one or more processors coupled with the one or more memories. The one or more processors may individually or collectively be operable to execute the code to cause the utterance modification system to receive, from a first user, a first utterance during an interactive conversation session between the first user and a second user, receive, from a second user in response to the first utterance and during the interactive conversation session, a second utterance including a first set of content, transmit, to an LLM, a prompt including the second utterance and one or more prompt parameters associated with the second user, receive, from the LLM in response to the prompt, a third utterance including a second set of content that is based on the first set of content, the second set of content being associated with a target user tone that is based on the one or more prompt parameters, and transmit, to the first user in response to the first utterance, the third utterance during the interactive conversation session.

Another utterance modification system for data processing is described. The utterance modification system may include means for receiving, from a first user, a first utterance during an interactive conversation session between the first user and a second user, means for receiving, from a second user in response to the first utterance and during the interactive conversation session, a second utterance including a first set of content, means for transmitting, to an LLM, a prompt including the second utterance and one or more prompt parameters associated with the second user, means for receiving, from the LLM in response to the prompt, a third utterance including a second set of content that is based on the first set of content, the second set of content being associated with a target user tone that is based on the one or more prompt parameters, and means for transmitting, to the first user in response to the first utterance, the third utterance during the interactive conversation session.

A non-transitory computer-readable medium storing code for data processing is described. The code may include instructions executable by one or more processors to receive, from a first user, a first utterance during an interactive conversation session between the first user and a second user, receive, from a second user in response to the first utterance and during the interactive conversation session, a second utterance including a first set of content, transmit, to an LLM, a prompt including the second utterance and one or more prompt parameters associated with the second user, receive, from the LLM in response to the prompt, a third utterance including a second set of content that is based on the first set of content, the second set of content being associated with a target user tone that is based on the one or more prompt parameters, and transmit, to the first user in response to the first utterance, the third utterance during the interactive conversation session.

Some examples of the method, utterance modification systems, and non-transitory computer-readable medium described herein may further include operations, features, means, or instructions for converting, via a speech-to-text model of the utterance modification system, the second utterance from a first natural language format to a second natural language format that may be different from the first natural language format, where the prompt transmitted to the LLM includes the second utterance in the second natural language format and converting, via a text-to-speech model of the utterance modification system, the third utterance from the second natural language format to the first natural language form, where the third utterance transmitted during the interactive conversation session may be in the first natural language format.

In some examples of the method, utterance modification systems, and non-transitory computer-readable medium described herein, converting the third utterance from the second natural language format to the first natural language format may include operations, features, means, or instructions for transmitting, to a voice model of the text-to-speech model, the third utterance, the third utterance being converted from the second natural language format to the first natural language format via the voice model of the text-to-speech model, where the voice model of the text-to-speech model may be associated with the second user.

Some examples of the method, utterance modification systems, and non-transitory computer-readable medium described herein may further include operations, features, means, or instructions for receiving, from the second user, a set of multiple utterances for training the voice model and training the voice model in accordance with the set of multiple utterances based on receiving the set of multiple utterances such that the voice model may be associated with the second user.

In some examples of the method, utterance modification systems, and non-transitory computer-readable medium described herein, the text-to-speech model includes one or more voice models each associated with a respective user of a set of multiple users.

In some examples of the method, utterance modification systems, and non-transitory computer-readable medium described herein, the first natural language format may be a speech based natural language format and the second natural language format may be a text based natural language format.

Some examples of the method, utterance modification systems, and non-transitory computer-readable medium described herein may further include operations, features, means, or instructions for establishing a first interface between the utterance modification system and a communication platform that the interactive conversation session may be hosted on, where the first utterance may be received from the first user via the first interface, the second utterance may be received from the second user via the first interface, and the third utterance may be transmitted to the first user via the first interface and establishing a second interface between the utterance modification system and the LLM, where the prompt including the second utterance may be transmitted to the LLM via the second interface and the third utterance may be received from the LLM via the second interface.

Some examples of the method, utterance modification systems, and non-transitory computer-readable medium described herein may further include operations, features, means, or instructions for receiving, via a user interface, a user input that adjusts the one or more prompt parameters associated with the second user, where the target user tone may be adjusted based on the adjusted one or more prompt parameters.

In some examples of the method, utterance modification systems, and non-transitory computer-readable medium described herein, the one or more prompt parameters include a tone parameter, a response length parameter, a conversation timing parameter, or any combination thereof.

Some examples of the method, utterance modification systems, and non-transitory computer-readable medium described herein may further include operations, features, means, or instructions for receiving, from the second user, a set of multiple utterances during one or more of a set of multiple different interactive conversation sessions, generating, using the LLM, a set of multiple modified utterances, receiving, from the second user, a user input that modifies or accepts the set of multiple modified utterances, and generating, based on the user input, the one or more prompt parameters.

In some examples of the method, utterance modification systems, and non-transitory computer-readable medium described herein, the set of multiple utterances and the set of multiple modified utterances may be in a second natural language format that may be a text based natural language format.

The following provides an overview of aspects of the present disclosure:

Aspect 1: A method for data processing at an utterance modification system, comprising: receiving, from a first user, a first utterance during an interactive conversation session between the first user and a second user; receiving, from a second user in response to the first utterance and during the interactive conversation session, a second utterance comprising a first set of content; transmitting, to an LLM, a prompt comprising the second utterance and one or more prompt parameters associated with the second user; receiving, from the LLM in response to the prompt, a third utterance comprising a second set of content that is based at least in part on the first set of content, the second set of content being associated with a target user tone that is based at least in part on the one or more prompt parameters; transmitting, to the first user in response to the first utterance, the third utterance during the interactive conversation session.

Aspect 2: The method of aspect 1, further comprising: converting, via a speech-to-text model of the utterance modification system, the second utterance from a first natural language format to a second natural language format that is different from the first natural language format, wherein the prompt transmitted to the LLM comprises the second utterance in the second natural language format; and converting, via a text-to-speech model of the utterance modification system, the third utterance from the second natural language format to the first natural language form, wherein the third utterance transmitted during the interactive conversation session is in the first natural language format, Aspect 3: The method of aspect 2, wherein converting the third utterance from the second natural language format to the first natural language format comprises: transmitting, to a voice model of the text-to-speech model, the third utterance, the third utterance being converted from the second natural language format to the first natural language format via the voice model of the text-to-speech model, wherein the voice model of the text-to-speech model is associated with the second user.

Aspect 4: The method of aspect 3, further comprising: receiving, from the second user, a plurality of utterances for training the voice model; and training the voice model in accordance with the plurality of utterances based at least in part on receiving the plurality of utterances such that the voice model is associated with the second user.

Aspect 5: The method of any of aspects 3 through 4, wherein the text-to-speech model comprises one or more voice models each associated with a respective user of a plurality of users.

Aspect 6: The method of any of aspects 2 through 5, wherein the first natural language format is a speech based natural language format and the second natural language format is a text based natural language format.

Aspect 7: The method of any of aspects 1 through 6, further comprising: establishing a first interface between the utterance modification system and a communication platform that the interactive conversation session is hosted on, wherein the first utterance is received from the first user via the first interface, the second utterance is received from the second user via the first interface, and the third utterance is transmitted to the first user via the first interface; and establishing a second interface between the utterance modification system and the LLM, wherein the prompt comprising the second utterance is transmitted to the LLM via the second interface and the third utterance is received from the LLM via the second interface.

Aspect 8: The method of any of aspects 1 through 7, further comprising: receiving, via a user interface, a user input that adjusts the one or more prompt parameters associated with the second user, wherein the target user tone is adjusted based at least in part on the adjusted one or more prompt parameters.

Aspect 9: The method of any of aspects 1 through 8, wherein the one or more prompt parameters include a tone parameter, a response length parameter, a conversation timing parameter, or any combination thereof.

Aspect 10: The method of any of aspects 1 through 9, further comprising: receiving, from the second user, a plurality of utterances during one or more of a plurality of different interactive conversation sessions; generating, using the LLM, a plurality of modified utterances; receiving, from the second user, a user input that modifies or accepts the plurality of modified utterances; and generating, based at least in part on the user input, the one or more prompt parameters.

Aspect 11: The method of aspect 10, wherein the plurality of utterances and the plurality of modified utterances are in a second natural language format that is a text based natural language format.

Aspect 12: An utterance modification system for data processing, comprising one or more memories storing processor-executable code, and one or more processors coupled with the one or more memories and individually or collectively operable to execute the code to cause the utterance modification system to perform a method of any of aspects 1 through 11.

Aspect 13: An utterance modification system for data processing, comprising at least one means for performing a method of any of aspects 1 through 11.

Aspect 14: A non-transitory computer-readable medium storing code for data processing, the code comprising instructions executable by one or more processors to perform a method of any of aspects 1 through 11.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at an utterance modification system, comprising:

receiving, from a first user, a first utterance during an interactive conversation session between the first user and a second user;

receiving, from the second user in response to the first utterance and during the interactive conversation session, a second utterance comprising a first set of content;

transmitting, to a large language model (LLM), a prompt comprising the second utterance and one or more prompt parameters associated with the second user;

receiving, from the LLM in response to the prompt, a third utterance comprising a second set of content that is based at least in part on the first set of content, the second set of content being associated with a target user tone that is based at least in part on the one or more prompt parameters; and transmitting, to the first user in response to the first utterance, the third utterance during the interactive conversation session.

2. The method of claim 1, further comprising:

converting, via a speech-to-text model of the utterance modification system, the second utterance from a first natural language format to a second natural language format that is different from the first natural language format, wherein the prompt transmitted to the LLM comprises the second utterance in the second natural language format; and converting, via a text-to-speech model of the utterance modification system, the third utterance from the second natural language format to the first natural language format, wherein the third utterance transmitted during the interactive conversation session is in the first natural language format.

3. The method of claim 2, wherein converting the third utterance from the second natural language format to the first natural language format comprises:

transmitting, to a voice model of the text-to-speech model, the third utterance, the third utterance being converted from the second natural language format to the first natural language format via the voice model of the text-to-speech model, wherein the voice model of the text-to-speech model is associated with the second user.

4. The method of claim 3, further comprising:

receiving, from the second user, a plurality of utterances for training the voice model; and training the voice model in accordance with the plurality of utterances based at least in part on receiving the plurality of utterances such that the voice model is associated with the second user.

5. The method of claim 3, wherein the text-to-speech model comprises one or more voice models each associated with a respective user of a plurality of users.

6. The method of claim 2, wherein the first natural language format is a speech based natural language format and the second natural language format is a text based natural language format.

7. The method of claim 1, further comprising:

establishing a first interface between the utterance modification system and a communication platform that the interactive conversation session is hosted on, wherein the first utterance is received from the first user via the first interface, the second utterance is received from the second user via the first interface, and the third utterance is transmitted to the first user via the first interface; and establishing a second interface between the utterance modification system and the LLM, wherein the prompt comprising the second utterance is transmitted to the LLM via the second interface and the third utterance is received from the LLM via the second interface.

8. The method of claim 1, further comprising:

receiving, via a user interface, a user input that adjusts the one or more prompt parameters associated with the second user, wherein the target user tone is adjusted based at least in part on the adjusted one or more prompt parameters.

9. The method of claim 1, wherein the one or more prompt parameters include a tone parameter, a response length parameter, a conversation timing parameter, or any combination thereof.

10. The method of claim 1, further comprising:

receiving, from the second user, a plurality of utterances during one or more of a plurality of different interactive conversation sessions;

generating, using the LLM, a plurality of modified utterances;

receiving, from the second user, a user input that modifies or accepts the plurality of modified utterances; and generating, based at least in part on the user input, the one or more prompt parameters.

11. The method of claim 10, wherein the plurality of utterances and the plurality of modified utterances are in a second natural language format that is a text based natural language format.

12. An utterance modification system for data processing, comprising:

one or more memories storing processor-executable code; and one or more processors coupled with the one or more memories and individually or collectively operable to execute the code to cause the utterance modification system to:

receive, from a first user, a first utterance during an interactive conversation session between the first user and a second user;

receive, from the second user in response to the first utterance and during the interactive conversation session, a second utterance comprising a first set of content;

transmit, to a large language model (LLM), a prompt comprising the second utterance and one or more prompt parameters associated with the second user;

receive, from the LLM in response to the prompt, a third utterance comprising a second set of content that is based at least in part on the first set of content, the second set of content being associated with a target user tone that is based at least in part on the one or more prompt parameters; and transmit, to the first user in response to the first utterance, the third utterance during the interactive conversation session.

13. The utterance modification system of claim 12, wherein the one or more processors are individually or collectively further operable to execute the code to cause the utterance modification system to:

convert, via a speech-to-text model of the utterance modification system, the second utterance from a first natural language format to a second natural language format that is different from the first natural language format, wherein the prompt transmitted to the LLM comprises the second utterance in the second natural language format; and convert, via a text-to-speech model of the utterance modification system, the third utterance from the second natural language format to the first natural language format, wherein the third utterance transmitted during the interactive conversation session is in the first natural language format.

14. The utterance modification system of claim 13, wherein, to convert the third utterance from the second natural language format to the first natural language format, the one or more processors are individually or collectively operable to execute the code to cause the utterance modification system to:

transmit, to a voice model of the text-to-speech model, the third utterance, the third utterance being converted from the second natural language format to the first natural language format via the voice model of the text-to-speech model, wherein the voice model of the text-to-speech model is associated with the second user.

15. The utterance modification system of claim 14, wherein the one or more processors are individually or collectively further operable to execute the code to cause the utterance modification system to:

receive, from the second user, a plurality of utterances for training the voice model; and train the voice model in accordance with the plurality of utterances based at least in part on receiving the plurality of utterances such that the voice model is associated with the second user.

16. The utterance modification system of claim 14, wherein the text-to-speech model comprises one or more voice models each associated with a respective user of a plurality of users.

17. The utterance modification system of claim 12, wherein the one or more processors are individually or collectively further operable to execute the code to cause the utterance modification system to:

establish a first interface between the utterance modification system and a communication platform that the interactive conversation session is hosted on, wherein the first utterance is received from the first user via the first interface, the second utterance is received from the second user via the first interface, and the third utterance is transmitted to the first user via the first interface; and establish a second interface between the utterance modification system and the LLM, wherein the prompt comprising the second utterance is transmitted to the LLM via the second interface and the third utterance is received from the LLM via the second interface.

18. The utterance modification system of claim 12, wherein the one or more prompt parameters include a tone parameter, a response length parameter, a conversation timing parameter, or any combination thereof.

19. A non-transitory computer-readable medium storing code for data processing, the code comprising instructions executable by one or more processors to:

receive, from a first user, a first utterance during an interactive conversation session between the first user and a second user;

receive, from the second user in response to the first utterance and during the interactive conversation session, a second utterance comprising a first set of content;

transmit, to a large language model (LLM), a prompt comprising the second utterance and one or more prompt parameters associated with the second user;

receive, from the LLM in response to the prompt, a third utterance comprising a second set of content that is based at least in part on the first set of content, the second set of content being associated with a target user tone that is based at least in part on the one or more prompt parameters; and transmit, to the first user in response to the first utterance, the third utterance during the interactive conversation session.

20. The non-transitory computer-readable medium of claim 19, wherein the instructions are further executable by the one or more processors to:

convert, via a speech-to-text model of an utterance modification system, the second utterance from a first natural language format to a second natural language format that is different from the first natural language format, wherein the prompt transmitted to the LLM comprises the second utterance in the second natural language format; and convert, via a text-to-speech model of the utterance modification system, the third utterance from the second natural language format to the first natural language format, wherein the third utterance transmitted during the interactive conversation session is in the first natural language format.

* * * * *